(12) United States Patent
Moulton et al.

(10) Patent No.: US 11,426,717 B2
(45) Date of Patent: Aug. 30, 2022

(54) CATALYST, STRUCTURES, REACTORS, AND METHODS OF FORMING SAME

(71) Applicant: The Regents of the University of Colorado, a body corporate, Denver, CO (US)

(72) Inventors: Staci A. Moulton, Broomfield, CO (US); Alan W. Weimer, Niwot, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 1128 days.

(21) Appl. No.: 15/527,630

(22) PCT Filed: Nov. 17, 2015

(86) PCT No.: PCT/US2015/061181
§ 371 (c)(1),
(2) Date: May 17, 2017

(87) PCT Pub. No.: WO2016/081513
PCT Pub. Date: May 26, 2016

(65) Prior Publication Data
US 2019/0015825 A1 Jan. 17, 2019

Related U.S. Application Data

(60) Provisional application No. 62/133,178, filed on Mar. 13, 2015, provisional application No. 62/080,951, filed on Nov. 17, 2014.

(51) Int. Cl.
*B01J 21/04* (2006.01)
*B01J 21/06* (2006.01)
(Continued)

(52) U.S. Cl.
CPC ....... *B01J 37/0221* (2013.01); *B01J 19/0093* (2013.01); *B01J 23/75* (2013.01);
(Continued)

(58) Field of Classification Search
CPC . B01J 21/04; B01J 21/06; B01J 21/063; B01J 21/08; B01J 21/12; B01J 23/22;
(Continued)

(56) References Cited

U.S. PATENT DOCUMENTS 4,403,026 A * 9/1983 Shimizu ............. G03G 5/08221
430/65
4,888,203 A * 12/1989 Rothschild ............ C04B 41/009
427/584
(Continued)

FOREIGN PATENT DOCUMENTS

CN 103594717 A 2/2014
WO 2014062359 A2 4/2014

OTHER PUBLICATIONS

WIPO, Notification of Transmittal of the International Search Report and the Written Opinion of the International Searching Authority, or the Declaration dated Feb. 1, 2016 in corresponding Int'l. Publication No. WO2016081513.
(Continued)

*Primary Examiner* — Cam N. Nguyen
(74) *Attorney, Agent, or Firm* — Snell & Wilmer L.L.P.

(57) ABSTRACT

Structures, catalysts, and reactors suitable for use for a variety of applications, including gas-to-liquid and coal-to-liquid processes and methods of forming the structures, catalysts, and reactors are disclosed. The catalyst material can be deposited onto an inner wall of a microtubular reactor and/or onto porous support structures using atomic layer deposition techniques.

18 Claims, 31 Drawing Sheets

(51) Int. Cl.

| | |
|---|---|
| B01J 21/08 | (2006.01) |
| B01J 21/12 | (2006.01) |
| B01J 23/22 | (2006.01) |
| B01J 23/34 | (2006.01) |
| B01J 23/40 | (2006.01) |
| B01J 23/42 | (2006.01) |
| B01J 23/44 | (2006.01) |
| B01J 23/46 | (2006.01) |
| B01J 23/54 | (2006.01) |
| B01J 23/56 | (2006.01) |
| B01J 23/64 | (2006.01) |
| B01J 23/74 | (2006.01) |
| B01J 23/745 | (2006.01) |
| B01J 23/75 | (2006.01) |
| B01J 23/755 | (2006.01) |
| B01J 23/76 | (2006.01) |
| B01J 23/847 | (2006.01) |
| B01J 23/889 | (2006.01) |
| B01J 23/89 | (2006.01) |
| B01J 35/00 | (2006.01) |
| B01J 35/02 | (2006.01) |
| B01J 35/10 | (2006.01) |
| B01J 37/02 | (2006.01) |
| B01J 37/08 | (2006.01) |
| B01J 37/34 | (2006.01) |
| B01J 19/00 | (2006.01) |
| C10G 2/00 | (2006.01) |

(52) U.S. Cl.
CPC ......... *B01J 35/006* (2013.01); *B01J 35/0013* (2013.01); *B01J 35/023* (2013.01); *B01J 35/1014* (2013.01); *B01J 37/08* (2013.01); *B01J 37/34* (2013.01); *C10G 2/33* (2013.01); *B01J 2219/00792* (2013.01); *B01J 2219/00801* (2013.01); *B01J 2219/00835* (2013.01)

(58) Field of Classification Search
CPC ... B01J 23/34; B01J 23/40; B01J 23/42; B01J 23/44; B01J 23/46; B01J 23/54; B01J 23/56; B01J 23/6482; B01J 23/6562; B01J 23/74; B01J 23/745; B01J 23/75; B01J 23/755; B01J 23/76; B01J 23/8472; B01J 23/8892; B01J 23/8906; B01J 23/8913; B01J 23/892; B01J 23/8926; B01J 23/8933; B01J 23/898; B01J 23/8986; B01J 35/0013; B01J 35/006; B01J 35/023; B01J 35/1014; B01J 37/0221; B01J 37/08; B01J 37/34
See application file for complete search history.

(56) References Cited

U.S. PATENT DOCUMENTS

| | | | | |
|---|---|---|---|---|
| 5,008,148 | A * | 4/1991 | Thurm | C08J 7/043 428/336 |
| 6,203,613 | B1 * | 3/2001 | Gates | C30B 25/02 117/104 |
| 6,211,113 | B1 | 4/2001 | Harth | |
| 6,391,803 | B1 * | 5/2002 | Kim | C23C 16/452 438/787 |
| 7,084,180 | B2 | 8/2006 | Wang | |
| 7,233,034 | B2 | 6/2007 | Liu | |
| 7,339,184 | B2 * | 3/2008 | Romano | B82Y 10/00 117/84 |
| 7,595,263 | B2 * | 9/2009 | Chung | C23C 16/02 257/E21.171 |
| 7,722,833 | B2 | 5/2010 | Wang | |
| 7,722,854 | B2 | 5/2010 | Watson | |
| 7,741,197 | B1 * | 6/2010 | Duan | H01L 21/02603 438/478 |
| 7,767,102 | B2 * | 8/2010 | Lemmi | H01L 29/775 216/13 |
| 7,829,602 | B2 | 11/2010 | Litt | |
| 8,100,996 | B2 | 1/2012 | Simmons | |
| 8,188,153 | B2 | 5/2012 | Wang | |
| 8,273,610 | B2 * | 9/2012 | Or-Bach | H01L 27/10802 438/142 |
| 8,642,416 | B2 * | 2/2014 | Or-Bach | H01L 27/0688 438/199 |
| 8,741,800 | B2 * | 6/2014 | Elam | B01J 35/1061 502/216 |
| 9,062,390 | B2 * | 6/2015 | Blomberg | H01L 21/02194 |
| 9,219,005 | B2 * | 12/2015 | Or-Bach | H01L 27/11526 |
| 9,385,088 | B2 * | 7/2016 | Or-Bach | H01L 27/1108 |
| 9,999,858 | B2 * | 6/2018 | Baumgart | B01D 67/0062 |
| 10,352,726 | B2 * | 7/2019 | Giedd | G01D 5/16 |
| 10,406,507 | B2 * | 9/2019 | Biener | B01J 35/002 |
| 2005/0234137 | A1 | 10/2005 | Espinoza | |
| 2012/0313227 | A1 * | 12/2012 | Or-Bach | H01L 23/481 257/659 |
| 2012/0315199 | A1 | 12/2012 | Neltner | |
| 2015/0111725 | A1 * | 4/2015 | Van Buskirk | B01J 21/063 502/200 |
| 2016/0351443 | A1 * | 12/2016 | George | B32B 15/20 |
| 2019/0336947 | A1 * | 11/2019 | Biener | B01J 37/349 |

OTHER PUBLICATIONS

WIPO, International Search Report dated Feb. 1, 2016 in corresponding Int'l. Publication No. WO2016081513.
WIPO, Written Opinion dated Feb. 1, 2016 in corresponding Int'l. Publication No. WO2016081513.
WIPO, International Preliminary Report on Patentability dated May 23, 2017 in corresponding Int'l. Publication No. WO2016081513.
WIPO, Notification Concerning Transmittal of International Preliminary Report on Patentability dated Jun. 1, 2017 in corresponding Int'l. Publication No. WO2016081513.

* cited by examiner

CATALYST, STRUCTURES, REACTORS, AND METHODS OF FORMING SAME

CROSS REFERENCE TO RELATED APPLICATIONS

This application is the national stage entry of International Application No. PCT/US15/061181, entitled CATALYST, STRUCTURES, REACTORS, AND METHODS OF FORMING SAME, and filed Nov. 17, 2015, and claims the benefit of U.S. Provisional Patent Application Ser. No. 62/080,951, entitled CATALYST INCLUDING A PROTECTIVE LAYER, REACTOR INCLUDING THE CATALYST, AND METHODS OF FORMING SAME, and filed Nov. 17, 2014, and U.S. Provisional Patent Application Ser. No. 62/133,178, entitled CRYSTALLINE CATALYST STRUCTURES AND METHODS OF FORMING AND USING SAME, and filed Mar. 13, 2015, the disclosures of which, including any appendices, are incorporated herein by reference to the extent such disclosures do not conflict with the present disclosure.

STATEMENT REGARDING FEDERALLY SPONSORED RESEARCH OR DEVELOPMENT

This invention was made with government support under grant number DE-AR0000291 awarded by the U.S. Department of Energy. The U.S. government has certain rights in the invention.

FIELD OF DISCLOSURE

The present invention generally relates to catalysts, catalyst support structures, and reactors including a catalyst.

BACKGROUND OF THE DISCLOSURE

Catalysts and reactors including catalysts can be used for a variety of purposes. For example, catalysts can be used to lower a temperature required for a reaction to take place, to increase a reaction rate at a temperature, and/or to drive particular reactions relative to other reactions that might otherwise be favored in the absence of a catalyst.

Catalysts are often employed in gas-to-liquid (GTL) and coal-to-liquid (CTL) reactions to form liquid hydrocarbons from natural gas (GTL) or coal (CTL). In these cases, a carbon source, such as natural gas or coal, is exposed to an oxidation or gasification process to produce synthesis gas (syngas), including hydrogen and carbon monoxide. Fischer Tropsch reactions (collectively called Fischer Tropsch process), using a suitable catalyst, can convert the hydrogen and carbon monoxide to products, such as synthetic oils and fuels. The products formed using a Fischer Tropsch process may be desirable because the products can have a relatively high energy density, may be relatively pure, and can be easily transported.

Liquid fuels can be produced from a Fischer Tropsch process on catalytic surfaces at pressures around 2-4 MPa and moderate temperature of about 200° C.-240° C. Primary reaction products are typically straight chain paraffins and tight control of reactor conditions can increase this product fraction and improve reactor productivity. However, a Fischer Tropsch process is highly exothermic with a heat of reaction of about −157 kJ/mol and up to −247 kJ/mol for $CH_4$ production, making temperature control difficult in most conventional reactors. Thermal gradients provide additional control difficulties. As reactor temperatures increase for a Fischer Tropsch process, selectivity favors formation of $CH_4$, which, in turn, causes more heat to be released and may result in thermal instabilities and a "runaway" reaction. Accordingly, improved catalysts, catalyst structures, and reactors, which may be used for a Fischer Tropsch process or other applications, and methods of forming the catalysts, catalyst structures, and reactors, are desired.

SUMMARY OF THE DISCLOSURE

Various embodiments of the disclosure relate to catalyst structures, catalysts including the structures, and to reactors including catalyst material. While the ways in which the various embodiments of the disclosure address the drawbacks of the prior art structures, catalysts, reactors, and methods are discussed in greater detail below, in general, the structures, catalysts, reactors, and methods in accordance with exemplary embodiments of this disclosure employ atomic layer, epitaxial, and/or chemical vapor deposition of one or more layers to provide a catalyst support and/or catalyst with desired properties. Exemplary catalyst structures exhibit superior activity, selectivity and/or stability, compared to catalysts formed using other techniques and/or having other features.

In accordance with exemplary embodiments of the disclosure, a method of forming a support structure includes the steps of providing a polymer support structure, depositing a metal (e.g., tungsten) and/or an oxide (e.g., alumina) overlying the polymer support structure using, e.g., atomic layer deposition, and (optionally) exposing the polymer support structure to a calcination process to remove the polymer support structure and/or a nitrogen environment to thereby form the support structure comprising a metal nitride (e.g., $WN_x$)—e.g., the surface of the metal layer may be terminated with nitrogen or nitrogen groups or with an oxide. In accordance with some aspects of these embodiments, metal (e.g., tungsten) nitride is thought to facilitate formation or deposition of subsequent material, such as metals typically used as catalysts. In accordance with various aspects of these embodiments, the metal/tungsten is deposited directly onto the polymer support structure. In accordance with other aspects, an oxide, such as a metal oxide (e.g., aluminum oxide (also referred to herein as alumina)) is deposited onto the polymer support structure and the metal (e.g., tungsten) is deposited onto the oxide. In accordance with yet further aspects, the optional step of exposing the polymer support structure to a calcination and/or heat-treatment process includes exposing the polymer support to one or more of an ammonia, hydrazine, air, and carbon dioxide reactant.

In accordance with additional exemplary embodiments of the disclosure, a method of forming an oxide (e.g., alumina, e.g., $Al_2O_3$) support structure includes the steps of providing a polymer support structure, depositing an oxide onto the support structure (e.g., using ALD), and heat treating the oxide. In accordance with various aspects of these embodiments, the heat treating occurs at a temperature of about 800° C. or more, or about 600° C. to about 1250° C., or about 700° C. to about 1000° C. for a period of about 2 to about 12 hours, or about 20 min to about 24 hours, or about 10 min to about 2 hours. Exemplary methods can also include a calcination step to remove the polymer support structure. The heat treating and the calcination can be combined into a single step—e.g., in an environment described herein in connection with either or both processes. The oxide can be deposited directly onto the polymer support structure or can be deposited onto metal/heat-conductive material overlying the oxide support structure.

In accordance with additional exemplary embodiments of the disclosure, a method of forming a catalyst structure includes the steps of providing a polymer support structure, depositing metal/heat-conductive material (e.g., tungsten) and/or an oxide (e.g., alumina) overlying the polymer support structure using, e.g., atomic layer deposition, (optionally) exposing the polymer support structure to a calcination process to remove the polymer support structure and/or a nitrogen environment to thereby form the metal (e.g., comprising $WN_x$) and/or oxide support structure, heat treating the catalyst structure, and depositing a catalyst, such as one or more metals selected from the group consisting of Co, Ni, FePt, NiPt, Rh, Ru, Pd, Os, V, Fe, and Mn, e.g., using, e.g., epitaxial deposition, onto the support structure. In accordance with various aspects of these embodiments, the optional step of exposing the polymer support structure to a calcination and/or heat-treatment process includes exposing the polymer support structure to an ammonia, hydrazine, air, oxygen, or other suitable oxidizing reactant. In accordance with further aspects of these embodiments, the metal/heat-conductive material or oxide is deposited directly onto the polymer support structure. By way of example, alumina is deposited directly onto a polymer support structure and the structure is submitted to heat treatment, such as the heat treatment noted above. In accordance with further aspects, a protective organic layer is retained on a surface of the structure (e.g., on the surface of the catalyst) after the ALD deposition. The protective layer can be, for example, a carbon chain or ring that can substitutionally react to give off the chain or ring and not form an oxide. In accordance with some examples, the protective layer includes organic material derived from an ALD precursor.

In accordance with further exemplary embodiments of the disclosure, a method of forming a catalyst structure includes providing an oxide support and depositing a catalyst, such as one or more metals selected from the group consisting of Co, Ni, FePt, NiPt, Rh, Ru, Pd, Os, V, Fe, and Mn, e.g., using atomic layer deposition, onto the oxide support, wherein the catalyst structure includes a protective organic layer that is resistive to oxidation. The protective organic layer can include, for example, a carbon group or chain that does not crack during exposure to operating temperatures of the catalyst structure, but rather substitutionally reacts with reactants (e.g., organic material derived from an ALD precursor). The carbon groups can be removed by exposing the catalyst material to a temperature less than 400° C., less than about 270° C., or a temperature of about 200° C. to about 300° C. or about 250° C. to about 275° C. in a reducing environment and a pressure of about 0.1 MPa to about 20 MPa or about 1 MPa to about 5 MPa. Alternatively, the carbon groups can be removed in a hydrogen environment. In this case, the temperature can range from about 200° C. to about 300° C. or about 250° C. to about 275° C. and the pressure can range from about 0.1 MPa to about 20 MPa or about 1 MPa to about 5 MPa.

In accordance with yet further embodiments, a catalyst support includes an oxide substrate, a catalyst, such as one or more metals selected from the group consisting of Co, Ni, FePt, NiPt, Rh, Ru, Pd, Os, V, Fe, and Mn, e.g., deposited using, e.g., atomic layer deposition, onto the oxide support, and a protective organic layer that is resistive to oxidation, such as the protective organic layers described herein.

In accordance with yet additional embodiments of the disclosure, a microtubular reactor (MTR) system includes one or more microtubular reactors, wherein each microtube includes an interior wall, wherein metal/heat-conductive material (e.g., tungsten) and/or oxide (e.g., alumina) is deposited onto the interior wall using, e.g., atomic layer deposition, and wherein a catalyst, such as one or more metals selected from the group consisting of Co, Ni, FePt, NiPt, Rh, Ru, Pd, Os, V, Fe, and Mn, is epitaxially deposited onto the metal/heat-conductive material and/or oxide using, e.g., atomic layer deposition. In accordance with various aspects of these embodiments, the metal/heat-conductive material, oxide, and/or catalyst is deposited using in-situ atomic layer deposition. The metal, oxide, and/or catalyst may be deposited as one or more continuous layers or as incomplete layers, such that, for example, a plurality of islands of catalyst material (e.g., having an average diameter of about 0.6 nm-25 nm, about 1 nm to about 20 nm, about 10 nm to about 20 nm, or about 2 to about 10 nm) forms on the interior surface of the wall. By way of example, alumina can be deposited onto a reactor wall, heat treated as noted above, and then a catalyst, such as Co, can be deposited onto the heat-treated alumina surface. The inventors surprisingly and unexpectedly found that catalyst features as small as 0.6 nm or 2-3 nm exhibited suitable activity and selectivity with the presence of epitaxial catalyst planes.

In accordance with yet additional exemplary embodiments of the disclosure, a microtubular reactor includes one or more reactor tubes, each tube having an inner wall and an outer wall, and a catalytic structure chemically bonded to the inner wall, wherein the catalytic structure comprises metal/heat-conductive material (e.g., tungsten) and/or oxide (e.g., alumina) and optionally a catalyst—e.g., one or more metals selected from the group consisting of Co, Ni, FePt, NiPt, Rh, Ru, Pd, Os, V, Fe, and Mn. The metal/heat-conductive material and/or oxide and optionally the catalyst can be epitaxially deposited using, e.g., atomic layer deposition, such as in-situ atomic layer deposition. In accordance with various aspects of these embodiments, the catalytic structure is formed by depositing metal and/or oxide onto polymer support structures attached to the inner wall and optionally removing the polymer support structures—e.g., using a calcination process as described herein. The metal/heat-conductive material can be heat treated as described herein.

In accordance with yet further exemplary embodiments of the disclosure, a method of forming a microtubular reactor includes the steps of providing one or more reactor tubes, providing sacrificial polymer material on an interior surface of the one or more reactor tubes (or providing one or more reactor tubes with the sacrificial polymer material attached to an inner wall of the one or more reactor tubes), depositing metal/heat-conductive material and/or oxide onto the sacrificial polymer material, optionally removing the sacrificial polymer material to form porous metal/heat-conductive material and/or oxide on the interior surface, and depositing a catalyst, such as one or more metals selected from the group consisting of Co, Ni, FePt, NiPt, Rh, Ru, Pd, Os, V, Fe, and Mn, onto the porous metal/heat-conductive material and/or oxide. In accordance with various aspects of these embodiments, the step of optionally removing the sacrificial polymer material includes exposing the polymer support structure to an ammonia or other suitable reactant—e.g., to form metal nitride or to an oxidant, such as air or oxygen. In accordance with various aspects of these embodiments, the metal/heat-conductive material and/or oxide is deposited directly onto the polymer support structure. In accordance with further aspects, the support structure is exposed to a heat-treatment process as described herein prior to depositing catalyst material onto the support structure.

In accordance with additional exemplary embodiments of the disclosure, a method of forming a microtubular reactor includes the steps of providing one or more reactor tubes, packing sacrificial polymer material into an interior of the one or more reactor tubes (or providing one or more reactor tubes packed with sacrificial polymer material), depositing metal/heat-conductive material and/or oxide onto the sacrificial polymer material, optionally removing the sacrificial polymer material to form porous material on the interior surface (e.g., using an ammonia or oxidizing calcination process), heat treating the porous material, and depositing a catalyst—e.g., including one or more metals selected from the group consisting of Co, Ni, FePt, NiPt, Rh, Ru, Pd, Os, V, Fe, and Mn onto the porous material. In accordance with various aspects of these embodiments, metal/heat-conductive material and/or oxide is deposited directly onto the polymer support structure using, e.g., atomic layer deposition; in accordance with other aspects, an oxide, such as a metal oxide (e.g., aluminum oxide) is deposited onto the polymer support structure using atomic layer deposition and the metal is deposited onto the oxide using atomic layer deposition. In accordance with further aspects, metal nitride may be formed on the surface of the metal. In accordance with further aspects, the catalyst retains a protective organic or carbon-containing layer that is resistant to oxidation at ambient conditions in air for an extended period—e.g. for about one month or more.

In accordance with further exemplary embodiments of the disclosure, a support catalyst includes a support structure having a surface comprising one or more crystalline regions and a crystalline catalyst layer formed overlying the one or more crystalline regions. The crystalline support structure can include, for example, in the case of alumina, gamma alumina, delta alumina, theta alumina, and/or alpha alumina. As described in more detail below, the crystalline catalyst layer can exhibit increased activity—e.g., be 3 times or more active than similar incipient wetness catalysts at the same or similar reaction conditions and conversions. In accordance with various aspects of these embodiments, a thickness of the catalyst layer ranges from about 1 to about 8 monolayers. The catalyst material can be deposited using, for example, ALD techniques. In accordance with further aspects, crystalline planes of the catalytic material are formed on a surface of the support structure. The crystalline planes have a dimension parallel a surface of the support structure of greater than 2 nm, greater than 5 nm, greater than 6 nm, or ranging from about 2 nm to about 200 nm. It is thought that catalyst crystalline planes, rather than (or more than) nanoparticles that may form on the surface, contribute to the higher than expected activity, selectivity and/or stability rates of the catalyst, compared to catalysts that do not include the crystalline planes. To form the crystalline planes, a lattice mismatch between the catalyst material and the oxide is desirably less than 5 percent. These support catalysts can form part of a microtubular reactor as discussed herein—e.g., using techniques described herein.

In accordance with additional exemplary embodiments of the disclosure, a method of forming a catalyst includes providing a catalyst support structure having one or more crystalline regions, and forming a crystalline catalyst catalytic (e.g., epitaxially) layer overlying the one or more crystalline regions. The support structure can be a surface area greater than or equal to 50 $m^2/g$, or about 50 $m^2/g$ to about 300 $m^2/g$, or 150 $m^2/g$ to about 300 $m^2/g$. In accordance with some aspects of these embodiments, the step of forming comprises epitaxial and/or ALD deposition. In accordance with further aspects, the step of providing a catalyst comprises providing an oxide support structure. The crystalline catalytic layer can include, for example, one or more of Co, Ni, FePt, NiPt, Rh, Ru, Pd, Os, V, Fe and Mn.

In accordance with further examples of the disclosure, metallic Co catalysts are deposited by ALD using cobaltocene ($CoCp_2$) and $H_2$.

In the case of cobalt catalysts, exemplary catalysts formed using cobaltocene have several advantages over similar catalysts formed using incipient wetness techniques and ALD of $Co_3O_4$ and other metallic Co ALD catalyst synthesis reactions. First, $CoCp_2$ is a less-expensive reactant than other precursors for metallic Co ALD. Second, $H_2$ can be used to deposit Co within a porous $Al_2O_3$, whereas plasma-assisted ALD requires line-of-sight and is not capable of deposition on internal surfaces for porous structures. Third, the metallic Co ALD catalysts are active for FTS without reducing them at temperatures above the reaction temperature; the maximum treatment temperature for the metallic ALD catalysts can be, for example, 543 K. Fourth, depositing metallic Co instead of $Co_3O_4$ by ALD results in higher Co catalyst productivity. Similar precursors can advantageously be used to deposit other catalyst material.

BRIEF DESCRIPTION OF THE DRAWING FIGURES

A more complete understanding of exemplary embodiments of the present disclosure may be derived by referring to the detailed description and examples when considered in connection with the following illustrative figures.

Figure 19A:
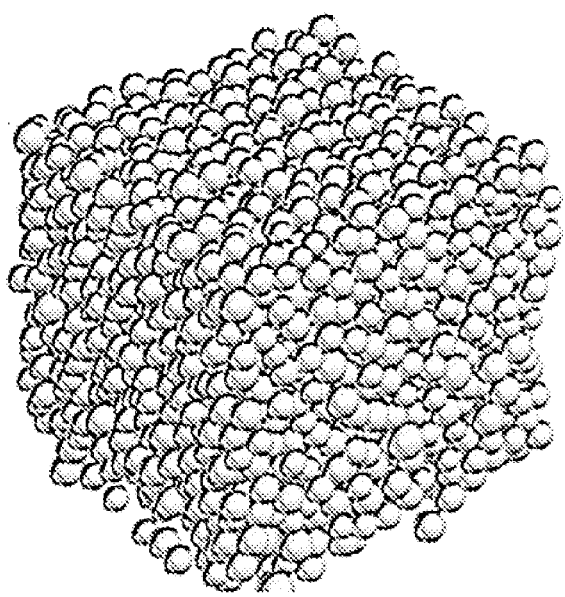
Figure 19B:
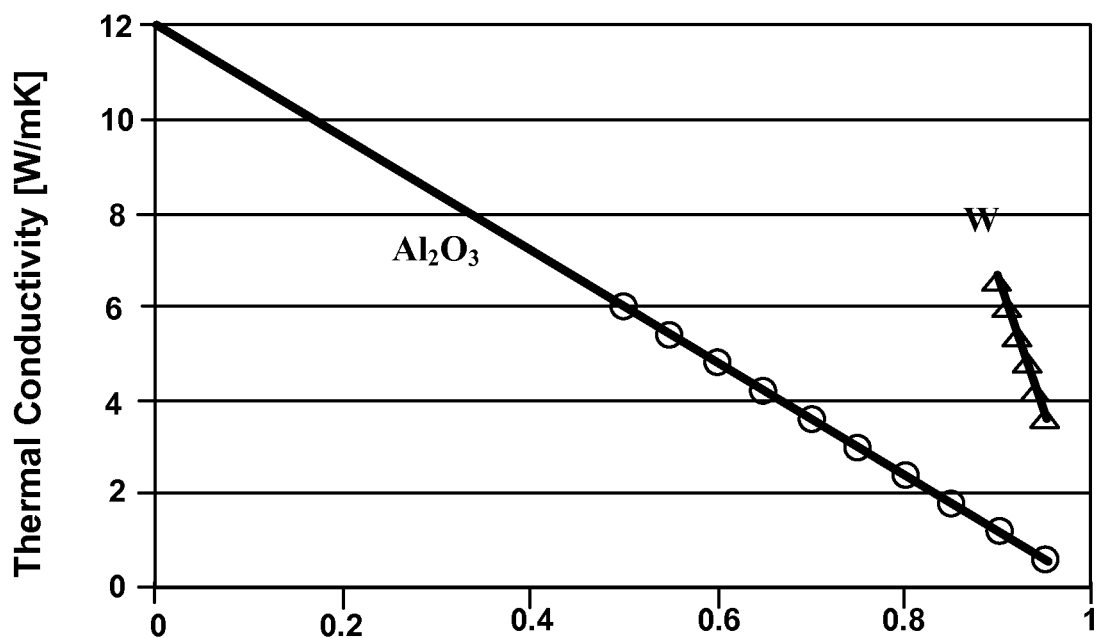
Figure 22:
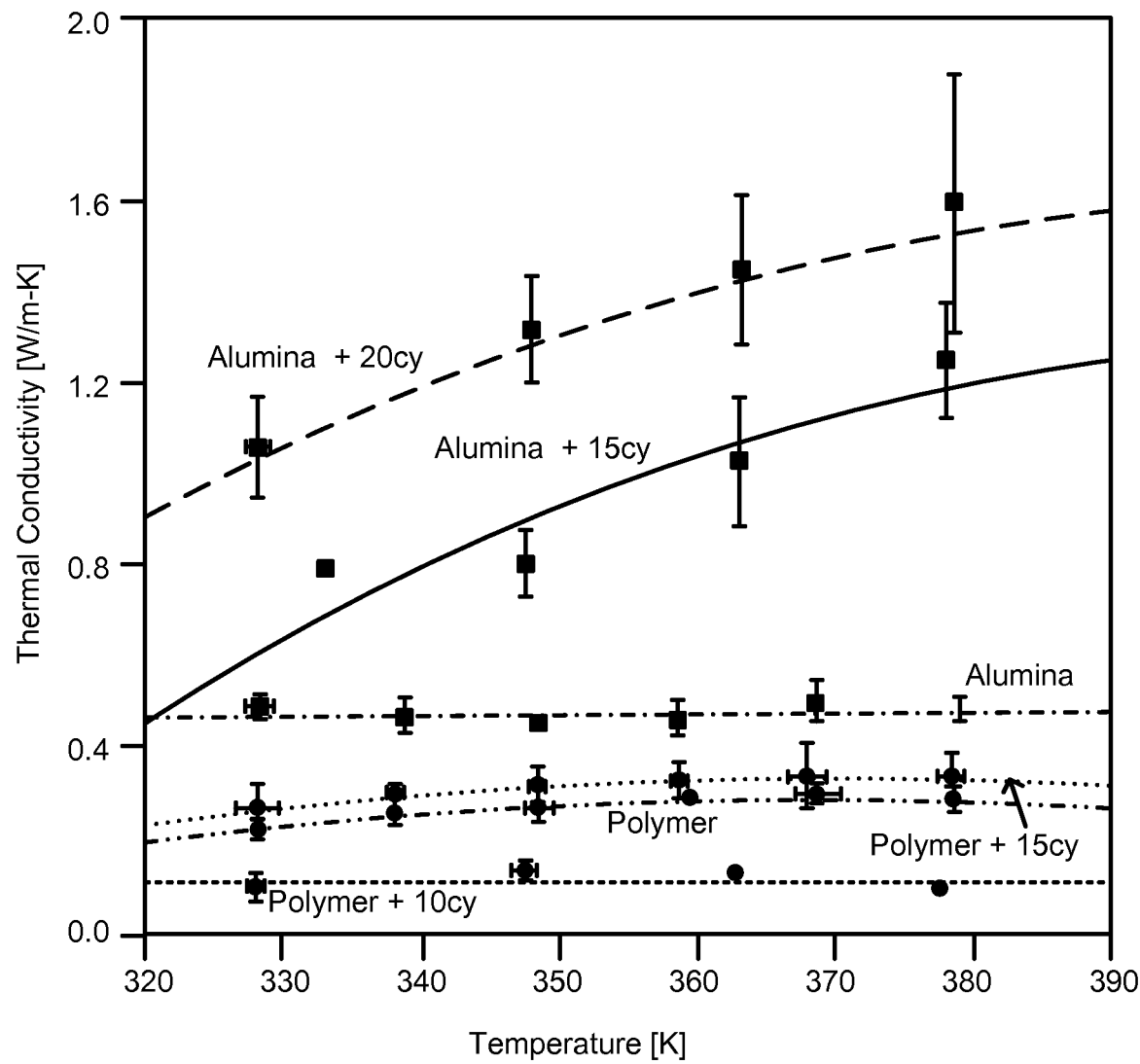

FIGS. 19(a), 19(b), and 22 illustrate a randomly packed particle bed and effective thermal conductivity of tungsten particles.

Figure 20:
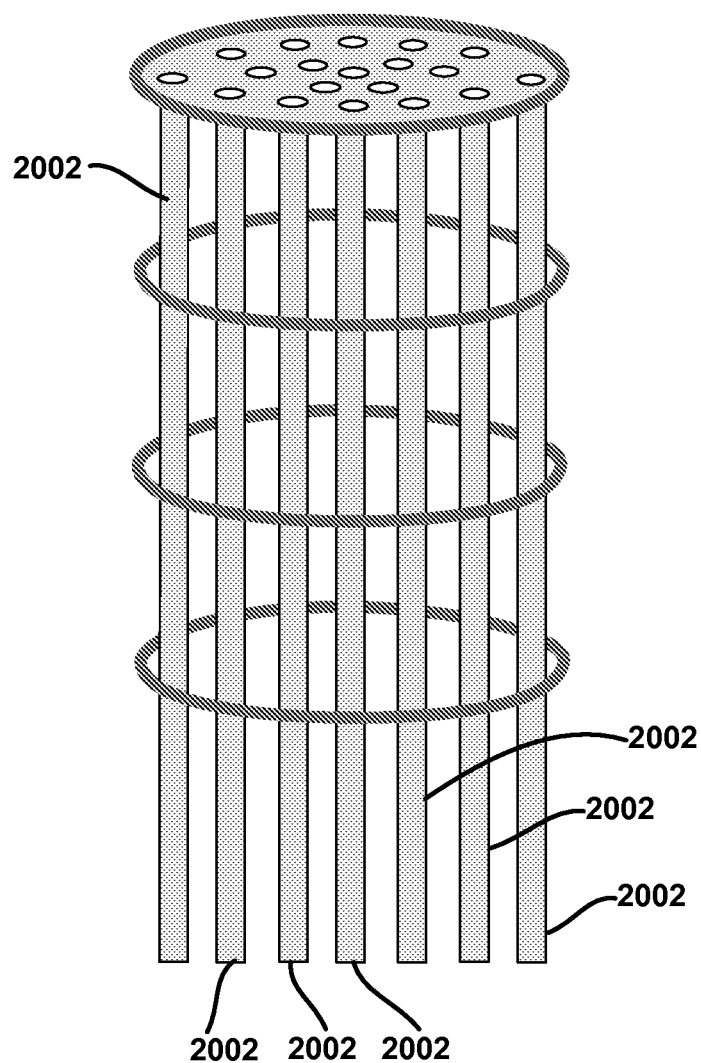

FIG. 20 illustrates a system, including a plurality of microtubular reactors, in accordance with yet further exemplary embodiments of the disclosure.

Figure 21:
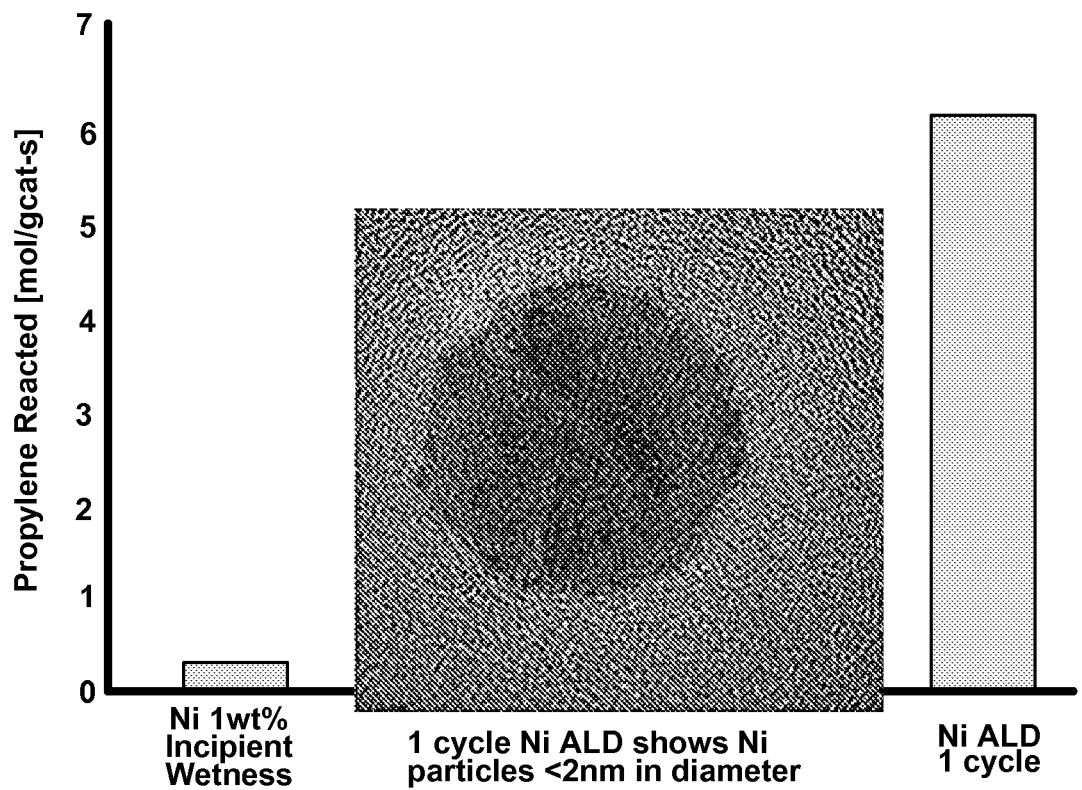

FIG. 21 illustrates a depiction of the activity for the hydrogenation of propylene, which compares a Ni catalyst produced via incipient wetness (1.0 wt. %) to that produced using ALD (0.6 wt. %).

FIGS. 23-28 illustrate results obtained from cobalt catalysts formed over alumina supports.

Figure 29:
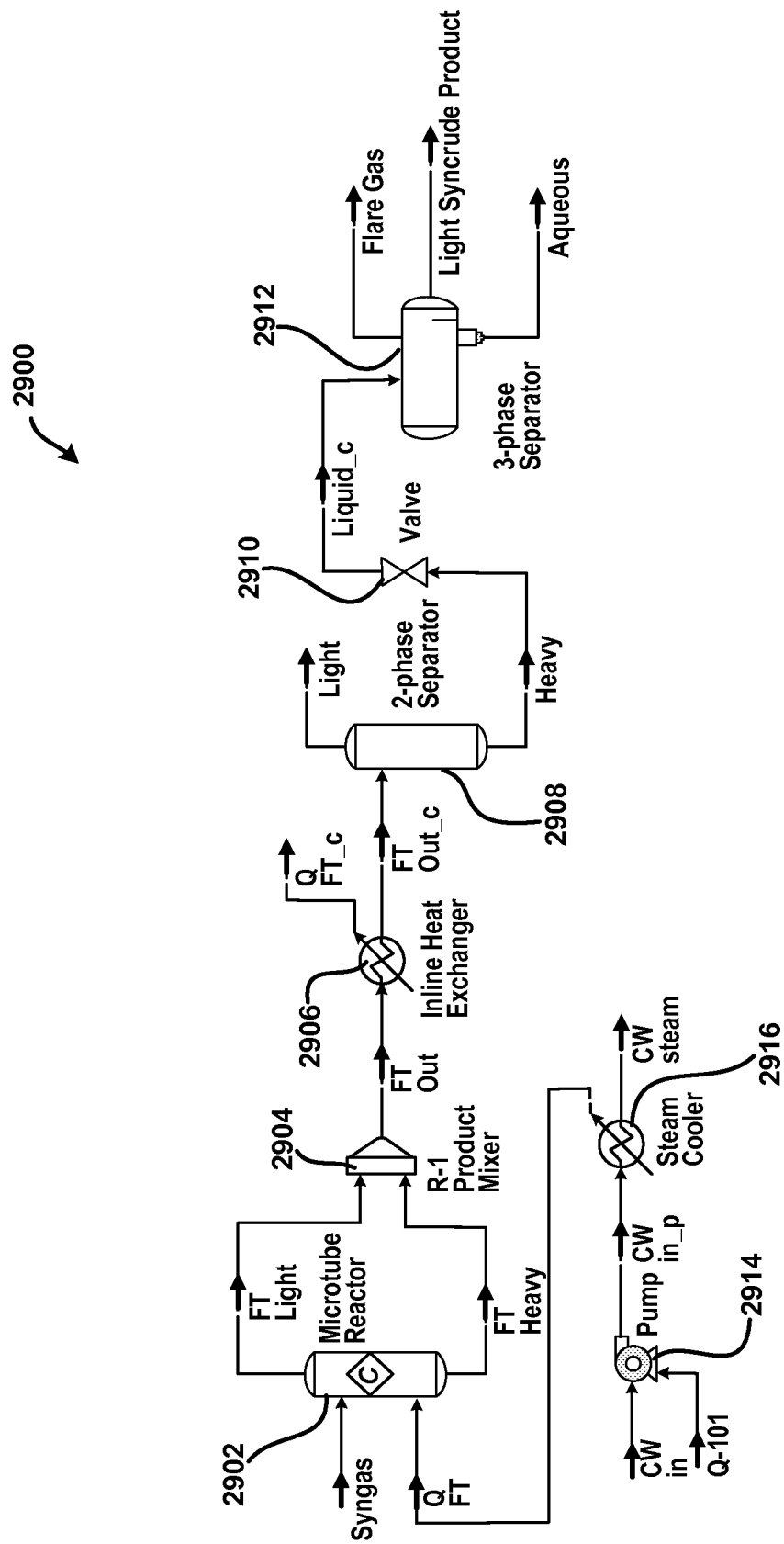
Figure 30:
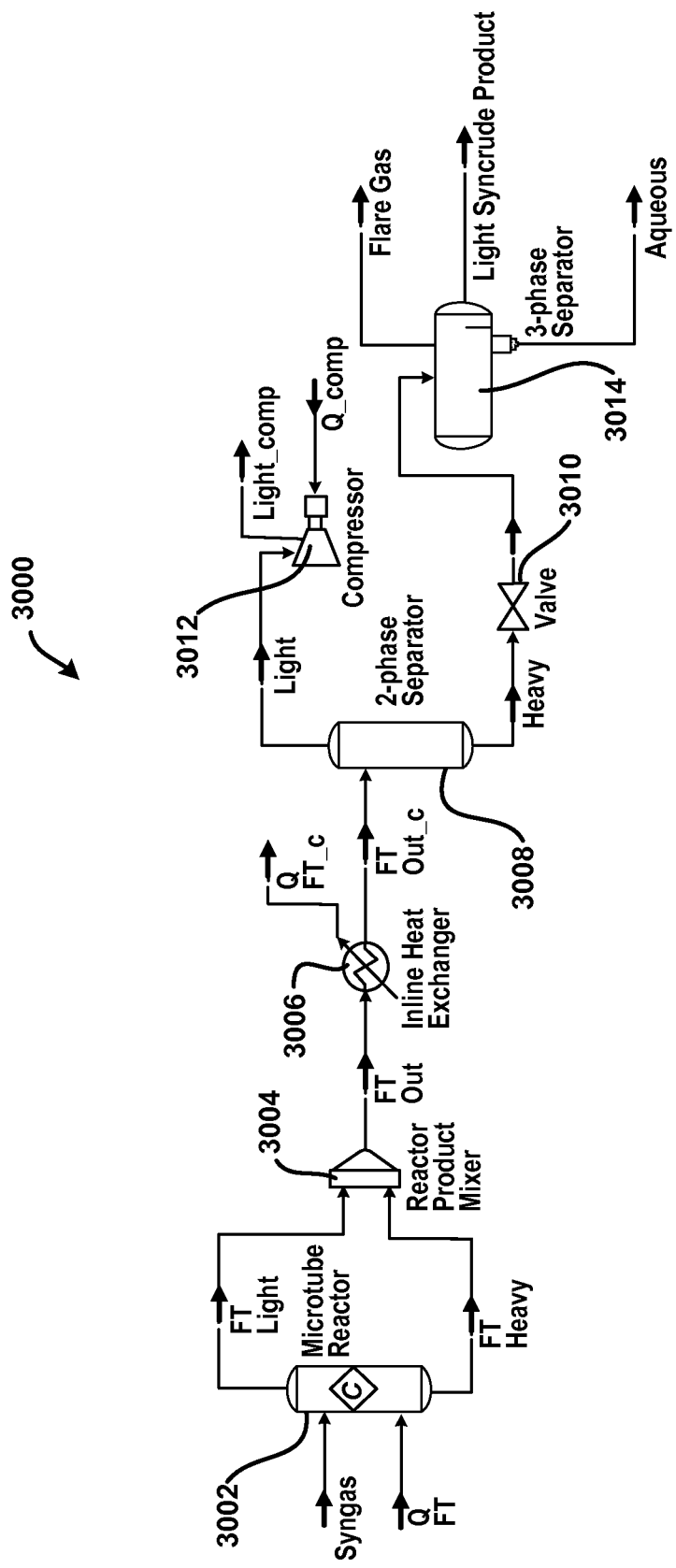
Figure 31:
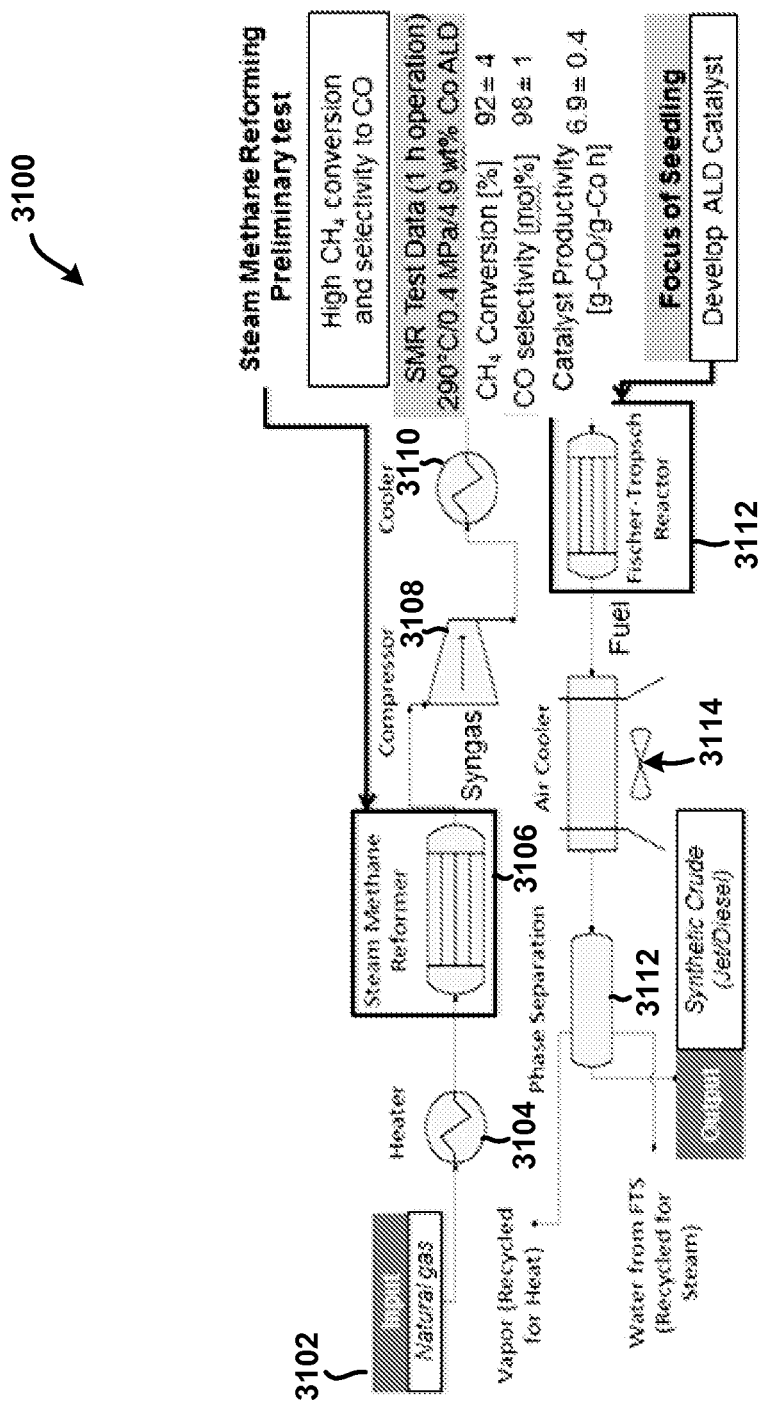

FIGS. 29-31 illustrate systems for forming light syncrude products in accordance with further exemplary embodiments of the invention.

Figure 32:
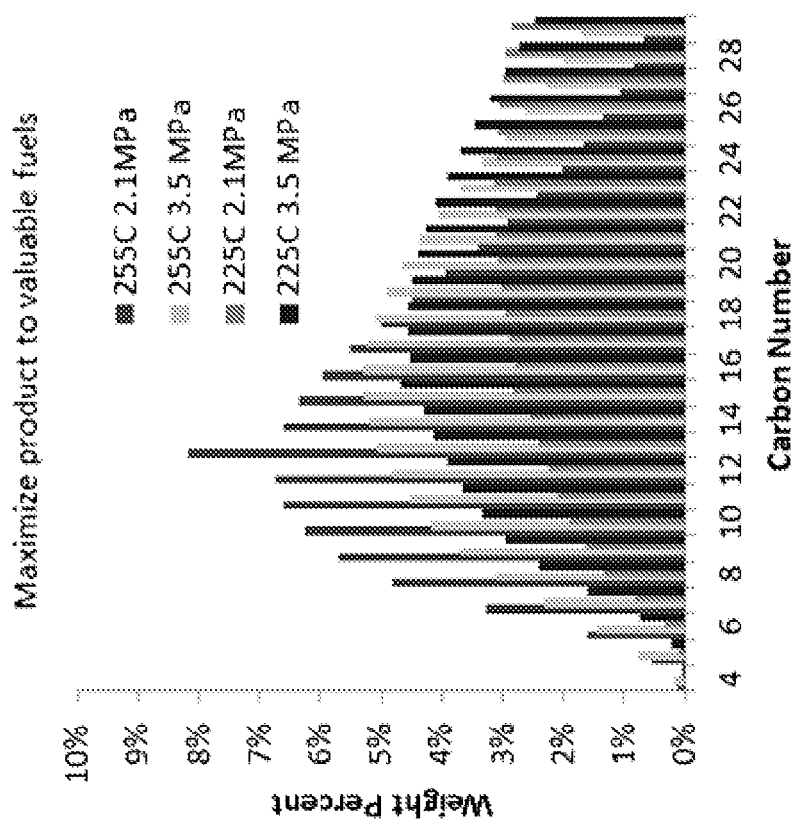

FIG. 32 illustrates additional experimental results for cobalt over alumina support catalysts in accordance with various exemplary embodiments of the disclosure.

Figure 33:
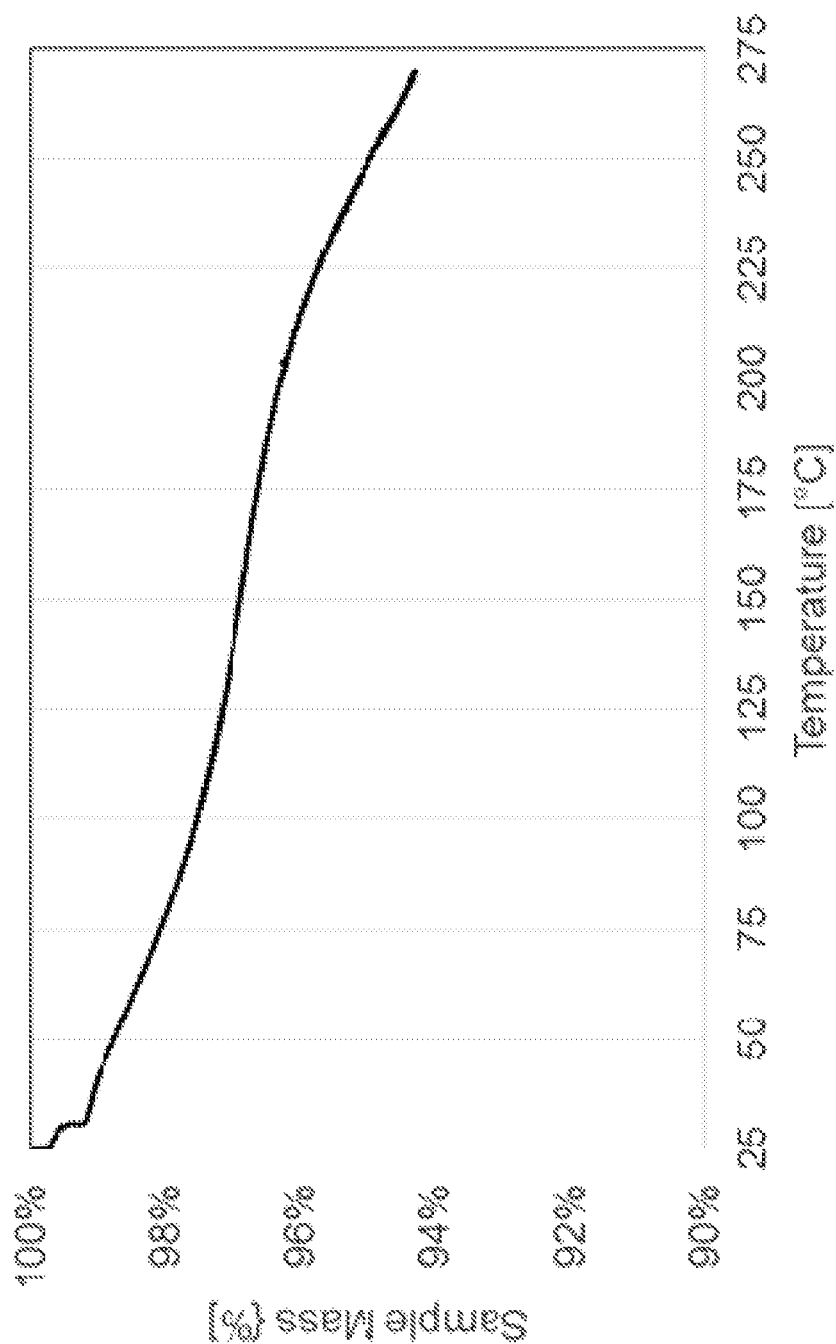

FIG. 33 illustrates thermogravimetric analysis (mass loss) of a catalyst with the protective organic surface layer in accordance with exemplary embodiments of the disclosure.

It will be appreciated that the figures are not necessarily drawn to scale. For example, the dimensions of some of the elements in the figures may be exaggerated relative to other elements to help to improve understanding of illustrated embodiments of the present invention.

DETAILED DESCRIPTION OF PREFERRED EMBODIMENTS OF THE INVENTION

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The present disclosure provides structures, catalysts, and reactors including a catalyst, and methods of forming and using the structures, catalysts, and reactors. The structures, catalysts, and reactors may be used in a variety of applications and are conveniently described below in connection with a Fischer Tropsch process. However, the disclosure is not so limited. For example, the structures, catalysts, and reactors including the catalyst can be used in steam methane reforming, ammonia synthesis, volatile organic carbon processes (e.g., for catalytic conversion), and other processes. As set forth in more detail below, exemplary catalyst structures described herein may exhibit better heat transfer compared to conventional structures, catalysts, and reactors, be easier to manufacture, be more active, be more selective, and/or use less catalyst material to achieve desired products.

Figure 1:
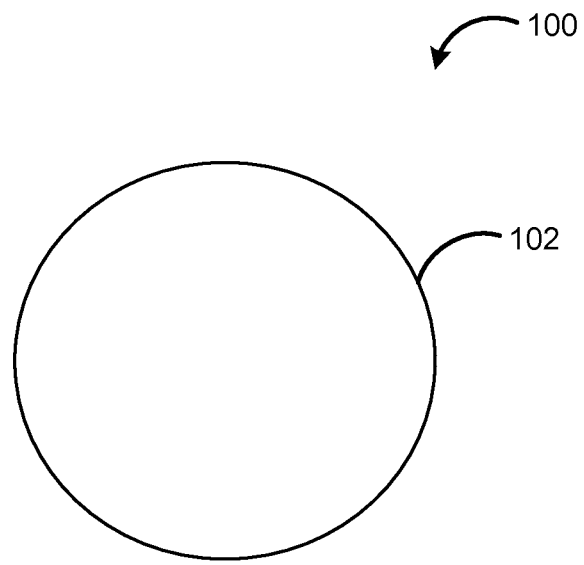
FIGS. 1 and 2 illustrate support structures in accordance with exemplary embodiments of the disclosure.

FIG. 1 illustrates a support structure 100 that is formed in accordance with various embodiments of the disclosure. In the illustrated example, support structure 100 includes a thin wall or layer of oxide material (e.g., alumina, silica, and/or titania) 102 about a perimeter and a generally hollow interior. Although illustrated as a solitary configuration, as set forth in more detail below, support structures are not so limited, and may include a variety of configurations and substructures. For example, the structure may contain both interconnected mesoporous and/or macroporous structures, which could have enhanced properties compared to single-size pore materials. In accordance with some exemplary embodiments of the disclosure, layer/wall 102 includes one or more crystalline regions that provide a crystalline template for a subsequently deposited catalyst material. As set forth in more detail below, the crystalline regions may exist within the structure, or may be formed using a suitable heat-treatment process.

Figure 2:
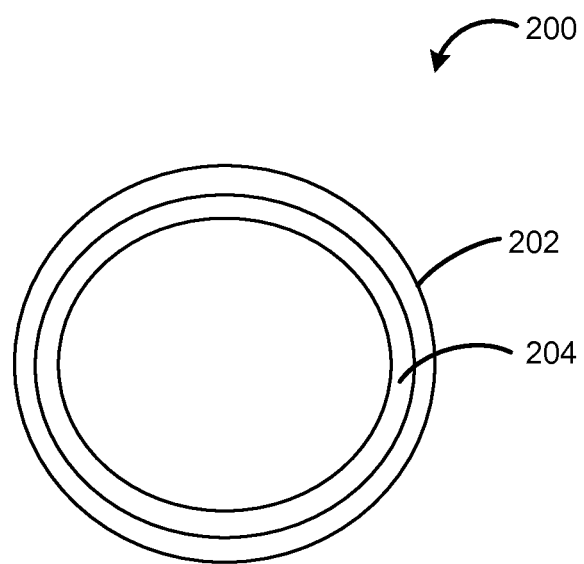

FIG. 2 illustrates another support structure 200. Support structure 200 is similar to support structure 100, except support structure 200 includes a heat-conductive layer (e.g., tungsten) 204 adjacent oxide material 202. Although heat-conductive layer 204 is illustrated as interior to oxide material 204, heat-conductive material 204 can alternatively be external or on top of oxide layer 202. In accordance with other embodiments of the disclosure, a support structure can include only the heat-conductive layer.

Figure 3:
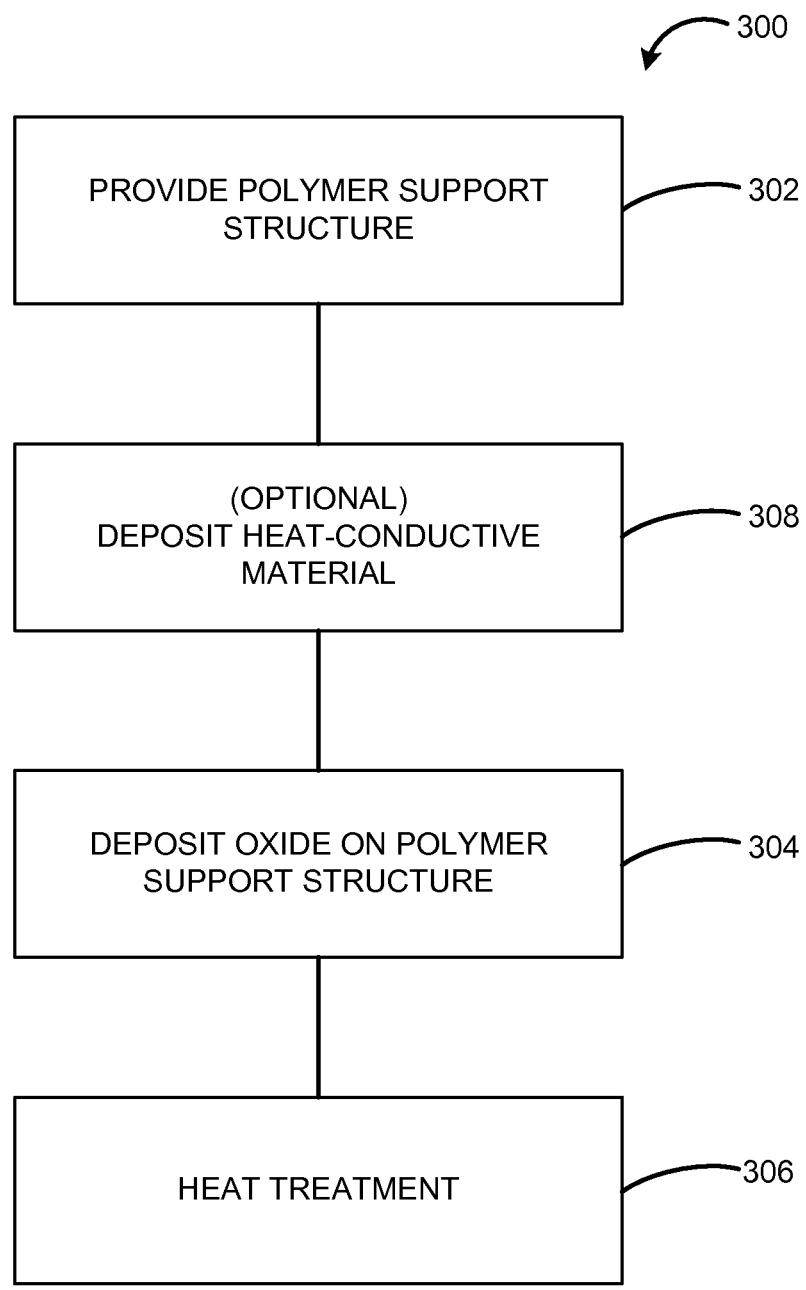
FIGS. 3 and 4 illustrate methods of forming support structures in accordance with exemplary embodiments of the disclosure.

FIG. 3 illustrates a method 300 of forming a support structure, such as structure 100. Method 300 includes the steps of providing a polymer support structure (step 302), depositing an oxide overlying the polymer support structure using, e.g., atomic layer deposition (step 304), and heat treating the structure (step 306).

Step 302 includes providing a sacrificial substrate or support structure that is used as a template for subsequently deposited oxide. The sacrificial support structure may be formed from a variety of materials, such as polymers or silica gel. Exemplary polymers suitable for use as a sacrificial substrate include resins, such as DOWEX™ PE-RT resins, available from the Dow Chemical company, Amberchrom™ particles available from Rohm and Haas Company, SuperQ particles available from Sigma-Aldrich, highly porous poly(styrene-divinylbenzene) (PS-DVB) particles, particularly those available as Cavilink™, and other high internal phase emulsion (HIPE) polymers formed by suspension or solution polymerization, and may be in a variety of forms, such as particles. In accordance with various aspects of these embodiments, step 302 includes providing a plurality of sacrificial polymer particles that constitute the sacrificial substrate. Although the term sacrificial is used to refer to a substrate/template material, the material need not necessarily be removed in all instances.

During step 304, the oxide is conformally deposited onto the support structure(s) using, e.g., chemical vapor deposition (e.g., atomic layer deposition (ALD)). ALD enables precise deposition of ultra-thin, highly conformal coatings over complex 3D topography structures (e.g., the sacrificial structure(s)), with excellent control over stoichiometry and properties, and allows deposition of the oxide onto the polymer structures without substantially changing the configuration of the structures. The films grown by ALD are inherently controlled by self-limiting sequential surface chemical reactions, so precursors are used efficiently.

It should also be noted that deposition by ALD on high surface area substrates substantially reduces and, for the case of particle ALD, may virtually eliminate any waste of precursors. The "near zero waste" of potentially expensive precursors is a major driver for ALD being a low cost process for placing nearly perfect ultra-thin films on high surface area supports. The fact that ALD is independent of line-of-sight and can coat internal pores just as easily as external surfaces with atomic level control contributes to high quality deposition throughout the substrate material, maintaining substrate structure and not filling in and closing off pores.

During step 306, the support structure is exposed to a heat treatment to form one or more crystalline regions. In accordance with exemplary aspects of these embodiments, the heat-treatment process includes exposing the polymer support structure to an ammonia, hydrogen, or oxygen environment. For example, the heat-treatment process may occur at a pressure of about 0.1 kPa to about 4 MPa, or about 1 kPa to about 4 MPa, or about 50 kPa to about 200 kPa, having a partial pressure of oxygen of about twenty percent, or about 1% to about 10% percent, or about 10% to about 80% percent at a temperature of about 200° C. to about 1000° C., or about 600° C. to about 1500° C., or about 600° C. to about 1100° C. A time can range from, for example, about 20 to about 24 hours, or about 4 to about 8 hours, or about 4 to about 24 hours. As illustrated, method 300 includes an optional step 308 of depositing a heat-conductive material, such as tungsten. For example, 1 to about 10 or about 2 to about 5 ALD layers or cycles of oxide may be deposited onto the polymer support structures after depositing about 15 to about 50 monolayers of tungsten.

Alternatively, oxide catalyst structures can be formed from oxide pellets, e.g., Alfa Aesar, labeled aluminum oxide, catalyst support, intermediate surface area (low $SiO_2$), ⅛" pellets. Exemplary structures can be prepared by grinding the pellets in a mortar and pestle, then sifting out the larger particles. Exemplary structures have diameters between about 50 and about 150 microns. Alternatively, the alumina particles can include spray dried catalyst support alumina particles. In these cases, the oxide may not need to be heat treated, because the material already includes one or more crystalline regions. In any case, support structures can have a relatively high surface area—e.g., about 50 to 300 m$^2$/g or about 150 to 300 m$^2$/g.

Figure 4:
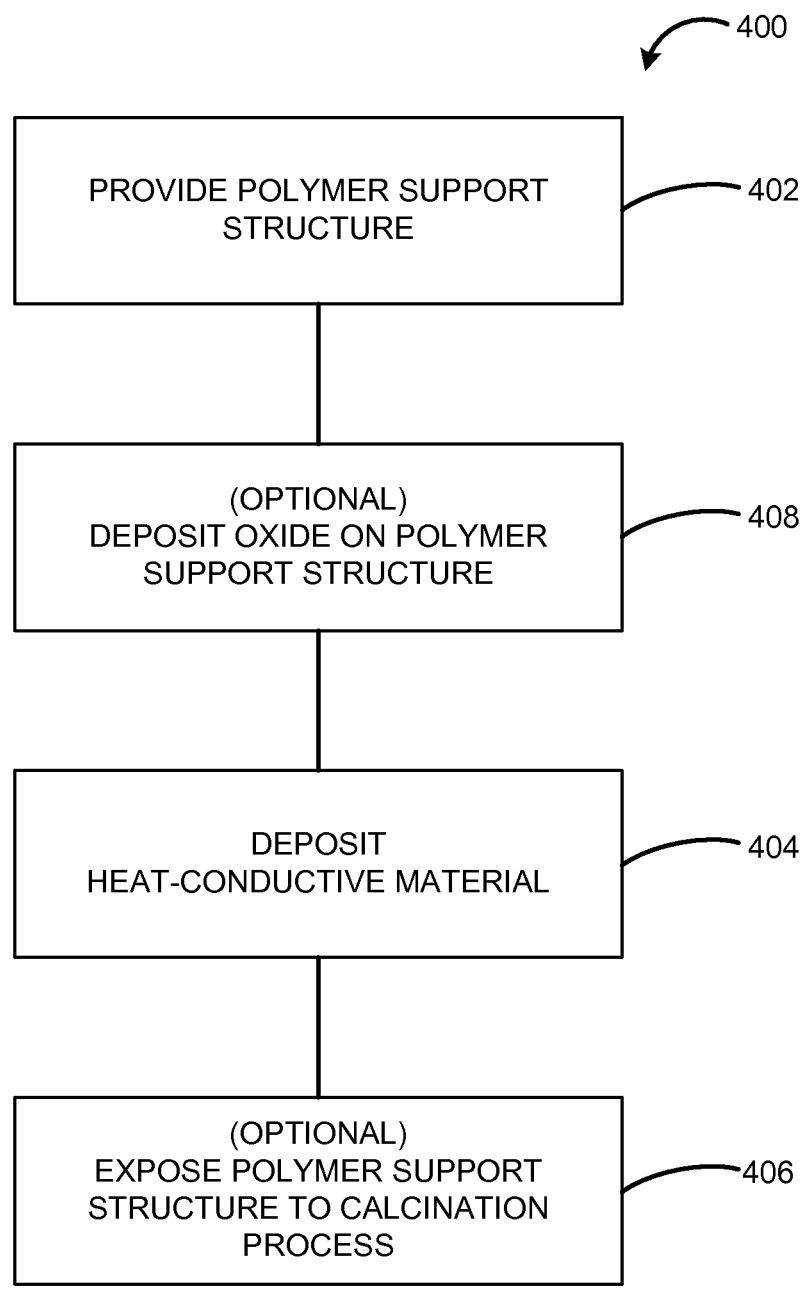

FIG. 4 illustrates an alternative method 400 of forming a support structure that includes only a heat-conductive layer. Method 400 includes the steps of providing a polymer support structure (step 402), depositing heat-conductive material overlying the polymer support structure using, e.g., atomic layer deposition (step 404), and optionally exposing the polymer support structure to a calcination process to remove the polymer support structure (step 406).

Step 402 includes providing a sacrificial substrate or support structure that is used as a template for subsequently deposited tungsten. The sacrificial support can be the same as described above.

During step 404, heat-conductive material is deposited onto the polymer support structure(s) using, e.g., atomic layer deposition (ALD). In the case of tungsten, a two-step reaction of $Si_2H_6$ and $WF_6$ can be used to form metallic tungsten, which deposits at a consistent growth rate of about 0.05 nm/cycle after an initiation period of 4-10 cycles on $Al_2O_3$ hydroxyl surfaces. By way of example, tungsten ALD was carried out on polymer surfaces at 80° C. on flat polymer films and particles. The low temperature reaction is desirable for structural integrity of the polymers, which changes once/if softening temperatures are reached. The absence or limited existence of surface functional groups, such as —OH or —$NH_2$ on native polymer surfaces is noted as a hindrance to nucleation of tungsten growth on polymers. In fact, growth of tungsten on native polymers may take more than 50 ALD cycles for measurable tungsten growth. However, when as few as 5 ALD cycles of $Al_2O_3$, using trimethylaluminum (TMA) and water, is deposited prior to tungsten ALD initiation, tungsten growth is measured within the first 25 ALD cycles. The mechanism of growth may be explained by the similar chemistry of the TMA methyl groups and polymers initiating —OH functional sites for nucleation of W ALD. As few as two cycles of tungsten have also been found to be sufficient. In accordance with various examples, about 20 to about 200 cycles or about 50 to about 100 cycles of tungsten are deposited onto a substrate.

During optional step 406, the polymer support structure (now coated with heat-conductive material) is exposed to a calcination process to remove the polymer support structure, leaving a heat-conductive material structure that may substantially mimic the polymer support structure. In accordance with exemplary aspects of these embodiments, the calcination process includes exposing the polymer support structure to an ammonia, hydrogen, or oxygen environment. For example, the calcination process may occur at a pressure of about 0.1 kPa to about 4 MPa, or about 1 kPa to about 4 MPa, or about 50 kPa to about 200 kPa, having a partial pressure of oxygen of about twenty percent, or about 1% to about 10% percent, or about 10% to about 80% percent, at a temperature of about 200° C. to about 1000° C., about 200° C. to about 1000° C., or about 200° C. to about 1000° C.

As illustrated, method 400 includes an optional step of depositing an oxide, such as aluminum oxide, onto a surface of the polymer support structure. For example, 1 to about 10 or about 2 to about 5 ALD layers or cycles of oxide may be deposited onto the polymer support structures prior to depositing the heat-conductive material.

Figure 5:
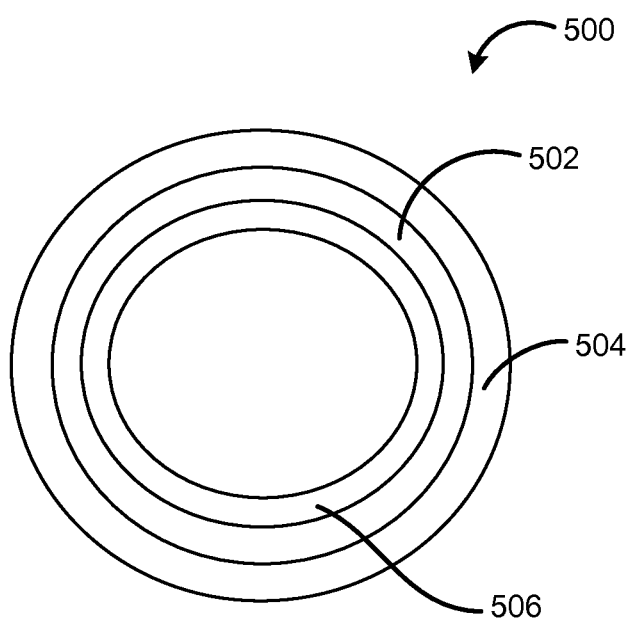
FIG. 5 illustrates a catalyst structure in accordance with additional exemplary embodiments of the disclosure.

FIG. 5 illustrates a catalyst structure 500 in accordance with additional exemplary embodiments of the disclosure. Structure 500 is similar to structure 200, except structure 500 includes a catalyst layer 504 overlying an oxide layer 502. Similar to structure 100, although structure 500 is illustrated as a singular sphere, structure 500 may include a more complex structure, such as a structure having mesoporous and/or macroporous structures and/or a structure used in packed-bed or coated-wall reactors. Further, although illustrated as a continuous layer, layer 504 may include isolated crystalline planes, as described in more detail below. In accordance with some embodiments of the disclosure, structure 500 can include a heat-conductive layer 506, which can be the same as heat-conductive layer 204. Exemplary catalyst structures can also include one or more grading layers between oxide layer 502 and catalyst layer 504.

Catalyst structure 500 can be formed using a sacrificial polymer support, as described below in connection with FIG. 6. Alternatively, catalyst structure 500 can be formed using pre-formed support particles, such as oxide (e.g., alumina) support particles, as described in connection with FIG. 7. By way of example, alumina support particles can be formed from alumina pellets (e.g., derived from Alfa Aesar, labeled aluminum oxide, catalyst support, intermediate surface area (low $SiO_2$), ⅛" pellets). The alumina support particles can have a relatively high surface area—e.g., about 50 to 300 m$^2$/g or about 150 to 300 m$^2$/g. Exemplary particles can be prepared by grinding the pellets in a mortar and pestle, then sifting out the larger particles. In this case, a heat-treatment step is not necessary to obtain the desired catalyst activity and selectivity. Alternatively, the oxide particles can include spray dried catalyst support alumina or other oxide particles.

Figure 6:
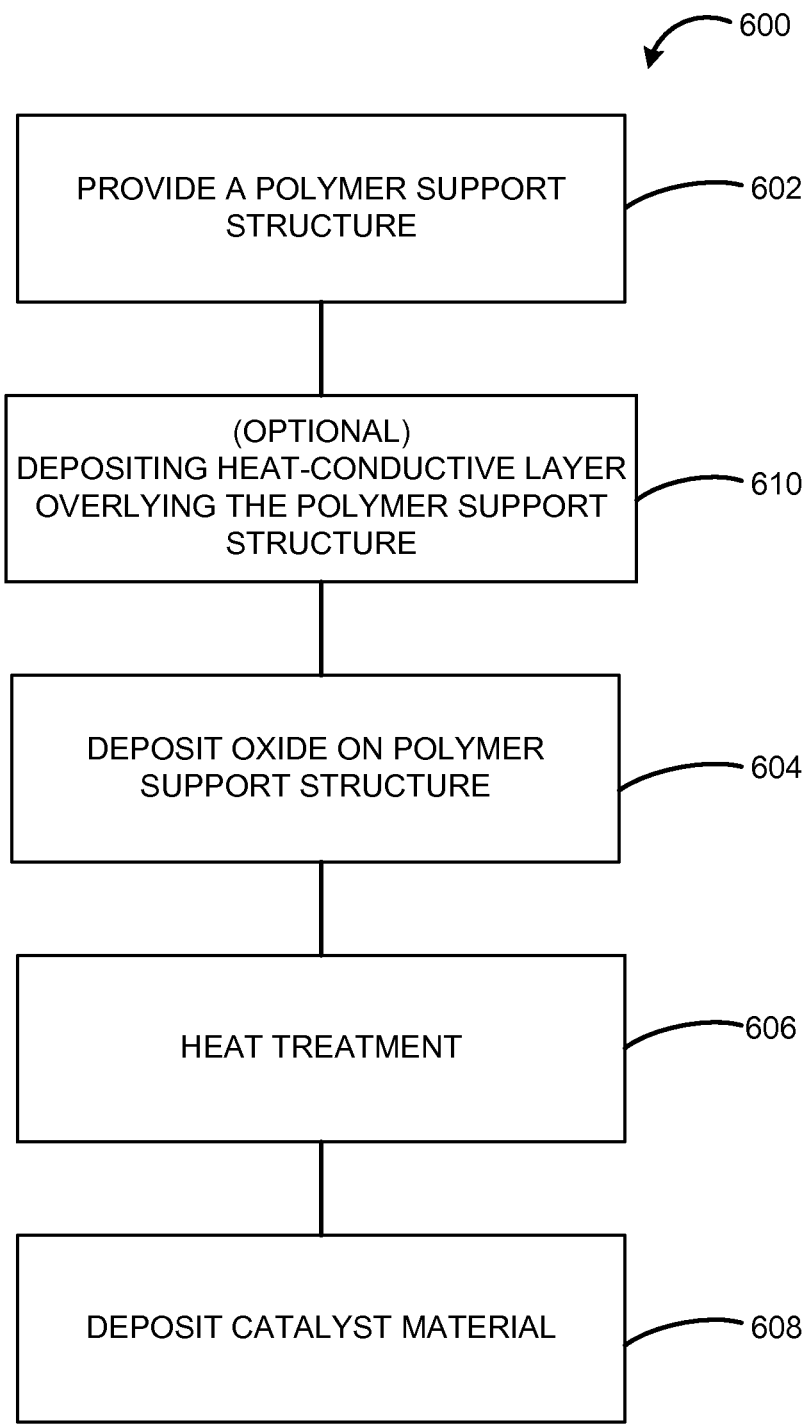
FIGS. 6-8 illustrate methods of forming a catalyst structure in accordance with additional exemplary embodiments of the disclosure.

FIG. 6 illustrates a method 600 of forming a catalyst structure, such as catalyst structure 500 illustrated in FIG. 5 or a similar structure. Method 600 includes the steps of providing a polymer support structure (step 602), depositing an oxide overlying the polymer support structure using, e.g., atomic layer deposition (step 604), exposing the support structure to a heat-treatment process to form crystalline regions (step 606), depositing (e.g., epitaxially) catalyst material, such as one or more metals selected from the group consisting of Co, Ni, FePt, NiPt, Rh, Ru, Pd, Os, V, Fe, and Mn, using, e.g., atomic layer deposition, onto the support structure (step 608), and an optional step of depositing heat-conductive material (step 610). Exemplary methods can optionally include depositing one or more grading layers between the oxide and catalyst layers.

Steps 602-606 and 610 may be the same or similar to steps 302-308 described above in connection with FIG. 3. Method 600 includes the additional step 608 of depositing catalyst material onto the oxide support. A number of layers of catalyst material may vary according to a variety of factors. However, less than ten cycles or about 1-10, 1-8, 2-8, or 4-8 cycles of ALD processing have been found to be sufficient. By way of example, cobalt catalyst material can be deposited onto the oxide using cobaltocene (bis(cyclopentadienyl) cobalt) and $H_2$ in an ALD process.

By way of particular example, catalysts were prepared in a packed bed reactor at 0.6-1.3 kPa in a two-step ALD process. An alumina support (Alfa Aesar), which had a surface area of 110 m$^2$/g and particle size of 60-75 μm, was loaded into a 12.7-mm diameter, stainless steel, tubular reactor and degassed with Ar purge at 473 K and 1.3 kPa for up to 12 hours to remove air and adsorbed water. The ALD cycles were performed with alternating flows of $CoCp_2$ (Strem Chemicals, 99.99%) at 483 K and UHP $H_2$ (Airgas) at 523 K with an intermediate Ar purge at 483 K. The higher reactor temperature was used during the $H_2$ dose to increase the rate of ligand removal. Previous studies used much higher temperatures (723 K) to deposit Co by ALD. Reaction products formed during ALD were monitored downstream of the reactor by a mass spectrometer (MKS C2000). A 1-cycle Co ALD catalyst was prepared with only a $CoCp_2$ dose because the Co retained protective organic surface groups when $CoCp_2$ was the final reactant. 4- and 8-cycle Co ALD catalysts were prepared with 4 and 8 $CoCp_2$ doses, respectively, but the final $CoCp_2$ cycle was performed without a subsequent $H_2$ exposure so as to retain the protective groups. After deposition cycles were complete, the catalysts were cooled to ambient temperature, and the reactor was filled with Ar to slightly above atmospheric pressure before removing the catalyst. Catalysts were stored in glass vials in air at room temperature.

In the case of cobalt catalyst material, application of ALD technique using cobaltocene as a precursor has multiple advantages. First, the use of cobaltocene as a reactant is a much less expensive route than other proposed chemistries for metallic Co deposition. Second, the deposition of a metallic Co by ALD will be more stable than, for example, Co deposited using an incipient wetness deposition for sintering because, once deposited, the catalyst does not need to be taken to high temperature for reduction and is chemically bonded to the surface. Third, the deposition of a metallic Co using cobaltocene compared to a cobalt oxide by ALD results in more complete use of the precious metal because the material does not have to be reduced.

Typically, the cost of an ALD precursor is more than that of the common liquid phase precursor that is used for commercial catalyst manufacture (chloroplatinic acid, metal nitrates, etc.). This cost disadvantage can be compensated by the inherent value in improved performance benefits normally attributable to nanoscale features (e.g., higher activity, better selectivity). These benefits are measured by the catalyst users relative to standard catalysts produced using incumbent technologies. However, the design and control freedom using this scheme may be what is most compelling to catalyst manufacturers, as the ultra-high dispersion, ultra-low loadings, and opportunity to sparingly decorate existing catalysts with secondary promoter elements, provides product differentiation and the ability to reduce noble metal loadings while maintaining desired performance.

Figure 7:
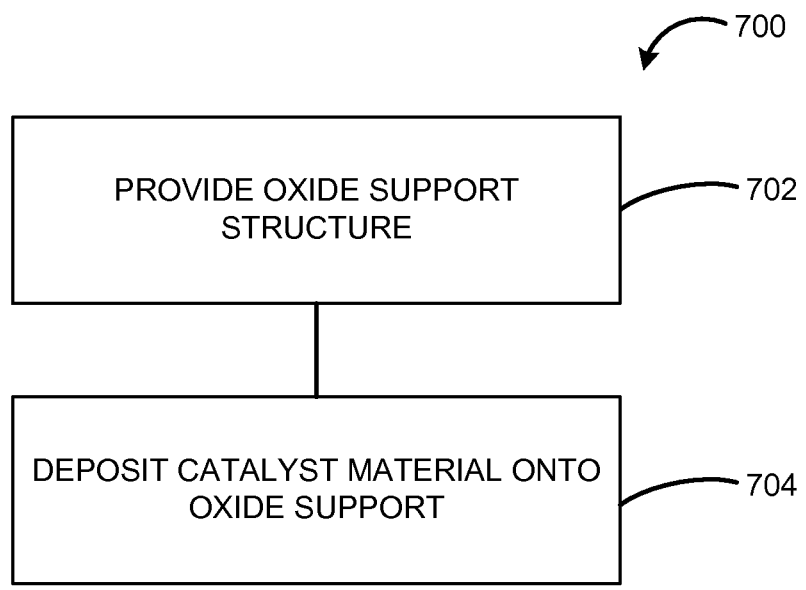

FIG. 7 illustrates another exemplary method 700 of forming a catalyst structure. Method 700 includes the steps of providing an oxide support structure (step 702) and depositing catalyst material onto the oxide support structure (step 704) and/or oxide structures formed using a sacrificial substrate. The oxide support structure can include the oxide (e.g., alumina) particles noted above. Step 702 can include providing an oxide support structure, such as an oxide structure disclosed herein. Step 704 can be the same or similar to step 608, described above. Further, method 700 can include an optional heat-conductive material deposition step as described herein. Methods 400 and 700 can also include an additional step of removing a protective layer from the deposited catalyst material.

Figure 9:
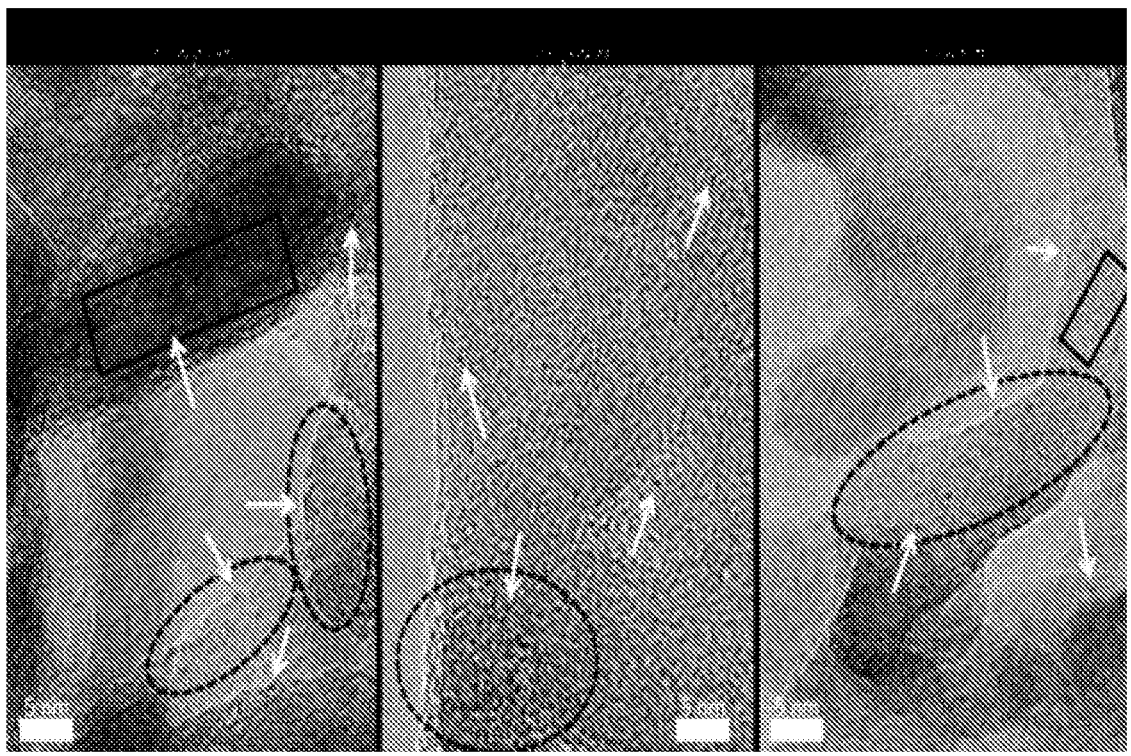
FIG. 9 illustrates crystalline planes of catalyst material in accordance with additional exemplary embodiments of the disclosure.

Methods 600 and 700 can be used to form catalyst material (e.g., material 504) that includes crystalline regions. The crystalline catalyst regions are thought to form over crystalline regions of the underlying oxide material and are thought to follow the crystalline pattern or template of the oxide. FIG. 9 illustrates crystalline planes that form over the oxide. These crystalline planes exhibit higher than expected activity and selectivity for FTS, as set forth in more detail below and in the appendix of U.S. Provisional Patent Application Ser. No. 62/133,178, entitled CRYSTALLINE CATALYST STRUCTURES AND METHODS OF FORMING AND USING SAME, and filed Mar. 13, 2015.

Figure 8:
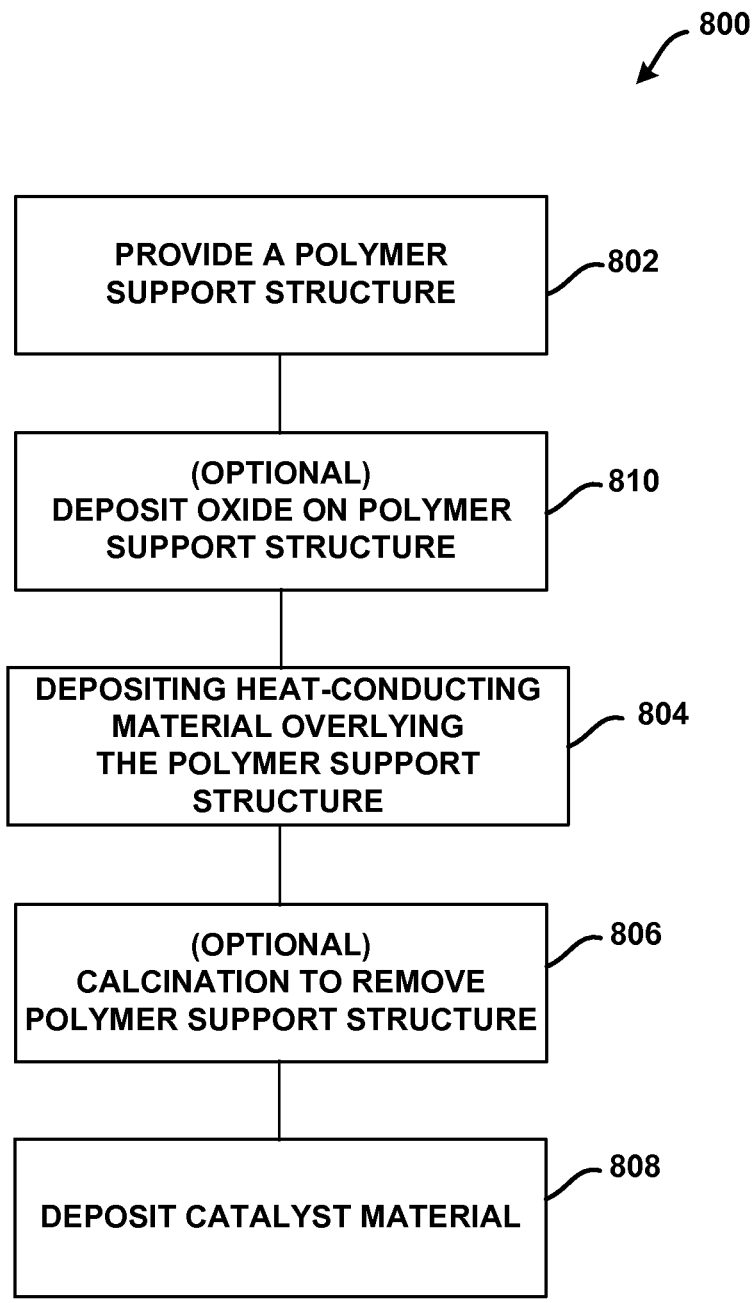

FIG. 8 illustrates another method 800 of forming a catalyst structure, such as the structure illustrated in FIG. 5 or similar structure. Method 800 includes the steps of providing a polymer support structure (step 802), depositing heat-conductive material overlying the polymer support structure using, e.g., atomic layer deposition (step 804), optionally exposing the polymer support structure to a calcination process to remove the polymer support structure and/or otherwise form metal (e.g., tungsten) nitride (step 806), and depositing catalyst material, such as one or more metals selected from the group consisting of Co, Ni, FePt, NiPt, Rh, Ru, Pd, Os, V, Fe and Mn, using, e.g., atomic layer deposition, onto the tungsten support (step 808).

Steps 802-806 and 810 may be the same or similar to steps 402-406 and 408 described above in connection with FIG. 4. Method 800 includes the additional step 808 of depositing catalyst material onto the support. A number of layers of catalyst material may vary according to a variety of factors. However, less than ten cycles or about 1-10, 1-8, 2-8, or 4-8 cycles of ALD processing have been found to be sufficient. By way of example, cobalt catalyst material can be deposited onto the oxide using cobaltocene (bis(cyclopentadienyl) cobalt) and $H_2$ in an ALD process.

Figure 10:
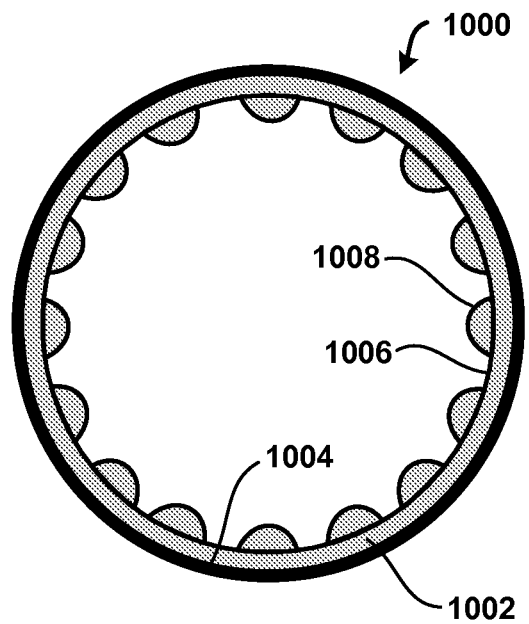
FIGS. 10-12 illustrate microtubular reactors in accordance with various exemplary embodiments of the disclosure.
Figure 11:
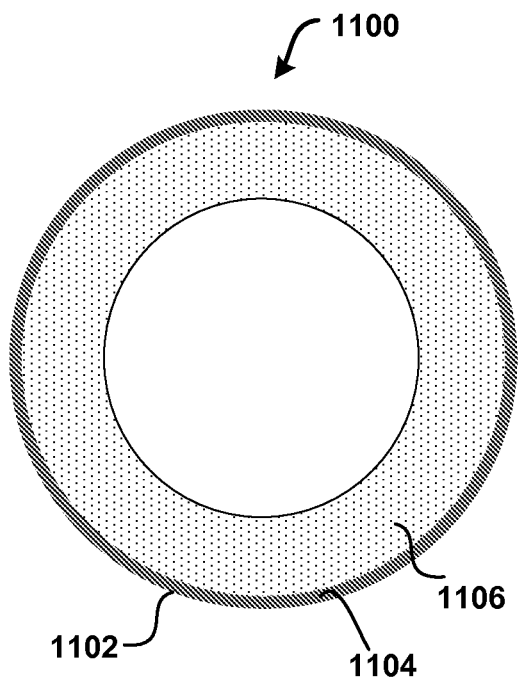
Figure 12:
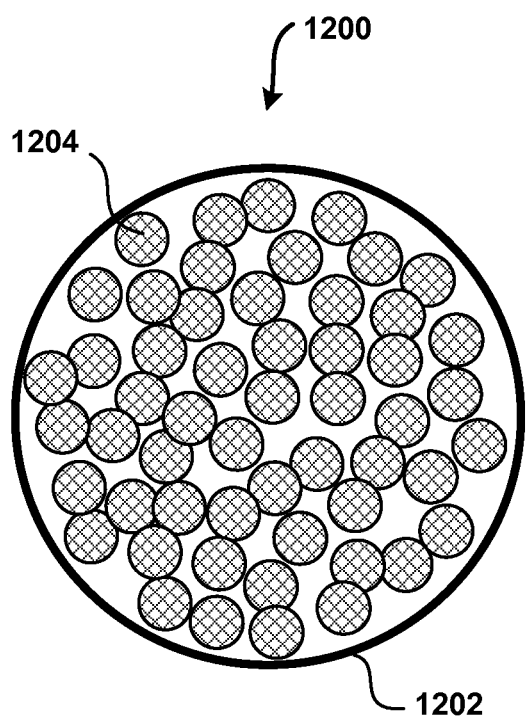

Turning now to FIGS. 10-12, exemplary microtubular reactors 1000, 1100, and 1200, in accordance with exemplary embodiments of the disclosure, are illustrated. The illustrated reactors are suitable for a variety of applications, including a low cost alternative to microreactor manufacturing technology for application in, e.g., gas-to-liquid (GTL)/coal-to-liquid CTL reactions, specifically Fischer Tropsch process reactions. The three exemplary reactor tube types discussed in detail below include a catalyst deposited on tube walls only, a packed bed, and a wall coating of porous material (e.g., alumina and/or tungsten) fabricated by ALD on sacrificial porous polymer structures followed by (optional) removal of the polymer and deposition of catalyst. Use of tungsten as heat-conductive material in some applications may be advantageous over other compounds, such as oxide (e.g., $Al_2O_3$), because the bulk thermal conductivity of tungsten is over five times greater than that of $Al_2O_3$. However, use of alumina support structures may be advantageous in other applications, because the alumina support structures allow formation of catalysts with desired properties, as discussed in more detail herein. Exemplary reactor designs combine in-situ fabrication of supports and catalysts—e.g., the catalysts and structures described herein—using ALD within microtubes.

Exemplary reactor tubes described herein provide (1) high surface-to-volume ratios that improve heat removal from reactions (e.g., Fischer Tropsch reactions) producing isothermal conditions; (2) improved control of reactor temperature that diminish opportunity for reactor thermal runaway; (3) methane production minimization that is possible due to removing reactor thermal gradients making it advantageous to operate at high CO conversion resulting in higher productivity to liquid fuels; (4) selectivity to a smaller range of fuel products produced from Fischer Tropsch reactions that is possible with increased temperature controllability; (5) metallic catalyst deposition by ALD that increases the utilizable catalytic surface, decreasing the precious metal loadings needed for high productivity; and (6) overall efficiency of GTL/CTL feedstock to fuel processes by directly producing more liquid fuel from reactor inlet flows. Manufacturing cost decreases for the conceptualized reactor over state-of-the-art microreactors are supported by the following hypotheses: (7) all fabrication steps may be gas or liquid phase within microtubes which reduces equipment needed; and (8) scale-up to pilot-plant or commercial production may be achievable by increasing the number of microtubes in the multi microtubular heat exchange reactor. Each consecutive design illustrated in FIG. 10-12 increases available surface area for reaction within the same reactor volume. However, with each increase in the amount of porous material within the microtube, the heat transport distance from the exothermic reaction location to the reactor wall is increased. This balance between available surface area and heat transport may determine optimal reactor design. At the macro scale, the reactor design contains multiple microtubes, having diameters ranging from, for example, about 0.508 mm to about 2.54 mm inner diameter. The scale-up of a multitubular reactor can be easily designed for pilot plant to commercial scale.

The support structures, catalyst structures, and reactors described herein are suitable for Fischer Tropsch process reactions, as well as other reactions, such as those mentioned herein. There are two general types of Fischer Tropsch process reactions, high temperature (300-350° C.) and low-temperature (200-240° C.). This disclosure focuses on low-temperature reaction processing; however, the invention is not necessarily limited to the low-temperature reaction processing. Multiple reaction products are produced from low-temperature Fischer Tropsch reactions including olefins, alcohols and some branched molecules. However, the primary products are straight chain paraffins that range from $CH_4$ to high molecular weight waxes. The product distribution can be characterized by the single value a which is a modified chain growth probability model developed by Iglesia et al. in 1993, also known as the Exxon model. The generalized Fischer Tropsch reactions for the major products of a Fischer Tropsch process are shown in Equation 1. Oxygen is removed as water and is then available for a secondary reaction, i.e., water gas shift (WGS), which is shown in Equation 2. However, the WGS reaction can be controlled by selection of catalyst. Cobalt (Co) has no WGS activity whereas iron (Fe) does. The WGS reaction is important for FTS because the molar $H_2/CO$ ratio changes if the system is not in equilibrium and CO is converted to $CO_2$, which is not profitable and in most designs adds expensive carbon capture processing.

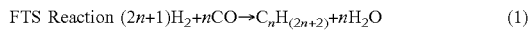

FTS Reaction $(2n+1)H_2 + nCO \rightarrow C_nH_{(2n+2)} + nH_2O$     (1)

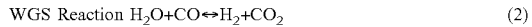

WGS Reaction $H_2O + CO \leftrightarrow H_2 + CO_2$     (2)

A rate of reaction per total Co (Co time yield (CTY))) was used to compare catalysts. FTS activities of the 1- and 4-ALD cycle catalysts as described herein were compared at 2.1 MPa and two temperatures; 513K and 528 K. At 513 K, a 1-cycle catalyst had 1/28th the CTY of the 4-cycle catalyst, whereas at 528 K, the 1-cycle catalyst had 1/10th the CTY of the 4-cycle catalyst. A reaction was run for 72 hours on the 1-cycle catalyst, and only 2.5 $cm^3$ of liquid fuel and 7.5 $cm^3$ of $H_2O$ formed. This low CO conversion meant the $H_2O$ formation rate was low, so not much $CO_2$ was produced by the water-gas-shift reaction. The 4- and 8-cycle catalysts were tested for 500 and 450 hours respectively, and their conversions and CTY were similar, but the selectivities to $CH_4$ and $CO_2$ were higher for the 8-cycle catalyst (FIG. 4.41 in the appendix of the '178 application).

The differences in activity and selectivity between catalysts is thought to be due to different Co structures. Nanoparticles smaller than 1.5 nm have been reported to have low FTS rates and high $CH_4$ selectivity. However, the structures observed in the HRTEM or STEM images were similar for the 1- and 4-cycle catalysts. Therefore, the difference in activity; namely, 1/28th and 1/10th, should not be attributed to the nanoparticles. Rather, these results suggest that the Co ALD growth is primarily on the Co planes in subsequent cycles, Volmer-Weber growth, and builds multi-atom thick crystalline planes of Co. TGA data showed that, for the 1-cycle catalyst, the majority of the Co atoms were on the $Al_2O_3$ surface because the C:Co ratio was five, which indicates that most Co retained their Cp ligand. Therefore, the order of magnitude increase in CTY with more than one cycle of Co ALD suggests this activity is due to the development of multi-atom thick planes which have a d-band electron free energy more closely related to bulk Co than a mono-atomic plane of Co on $\gamma$-$Al_2O_3$ (111).

In one example, a 9.4 wt % Co catalyst was prepared by atomic layer deposition (ALD) and activated in $H_2$ at 543K, a temperature no higher than the reaction temperatures. The Co time yield (reaction rate per Co-mass, CTY) ranged from 0.24-0.60 mmol-CO/g-Co·s. The catalysts deactivated over 500 hours of operation, and the CO conversion decreased 0.012 to 0.024% per day. Both Co nanoparticles and Co crystalline planes were present on the $Al_2O_3$ surface. The Co ALD catalyst had 3 times the CTY reported in the literature for incipient-wetness Co catalysts at comparable conditions.

Exemplary Co layers formed from atomic layer deposition (ALD), as described herein, which are directly prepared in metallic form, are different from IW catalysts, which are deposited as $Co_3O_4$, which must then be reduced to form an active metallic catalyst. The $Co_3O_4$ can be completely reduced above 800 K, but this often increases Co particle size and decreases surface area. Furthermore, oxide supports can form highly-stable, mixed-metal oxides with Co that are difficult to reduce. Exemplary catalyst structures with a 9.4 wt % Co ALD catalyst exceeded published CTY values of IW Co by 3 times at similar conditions, conversion and selectivity. The application of metallic Co ALD produced a surface with a higher fraction of active surface sites for FTS and increased the mass-specific activity, the CTY. Analyzing the structure of Co on the $Al_2O_3$ surface indicated the presence of both nanoparticles and crystalline Co planes. As noted above, multi-atom thick Co crystalline planes are thought to be responsible for the high activity of Co ALD catalysts. Therefore, these Co catalysts can capitalize on low value methane for GTL profitability.

Catalyst supports can also affect Fischer Tropsch process reactions, particularly impacting heat and mass transport properties as a function of particle diameter. Modeling has shown that $Al_2O_3$ support particle diameters larger than 400 μm result in internal temperature gradients >1° C., and 1 mm particles have gradients >6° C. These thermal gradient conditions affect Fischer Tropsch process product selectivity and may be an origin for reactor runaway. It has also been determined that mass transport distances greater than 50-100 μm result in diffusional resistances that limit reaction productivity. Pore diameter effects have been studied by many groups. In one particular 2002 study for $SiO_2$ with Co catalysts, an average pore diameter of 10 nm was found to produce the highest Fischer Tropsch process activity and optimal $C_{5+}$ selectivity with minimal $CH_4$ selectivity. The investigators concluded that this was due to an inability to form Co crystals within smaller pores. In their 2 nm pore sample, average crystal size was 20 nm—which can only form on the exterior of the particle. Their 10 nm pore sample produced Co crystals of 7.3 nm, which, again, correlates with other studies concerning Co particle size.

Prior work on the effect of Co particle size has concluded that supported catalysts reach a maximum activity at an approximate size of 10 nm. As the particle size becomes smaller than 10 nm, there is less activity and more selectivity toward $CH_4$.

The atomic controlled fabrication of a microstructured reactor as described herein is a major departure from standard packed bed and slurry bubble column reactor processing methods typically used for Fischer Tropsch processes. Additionally, the significant simplification of fabrication for the ALD-based microtubular reactor over current microchannel and monolithic reactor fabrication methods is disruptive. The simplified and lower-cost fabrication process provides for chemical reaction processing having equal or improved performance. A summary of comparative key process parameters of Fischer Tropsch reactions in the mentioned reactors is provided in Table 1. Additional benefits of exemplary reactors compared to packed bed, slurry bubble, monolithic, and microchannel reactors are provided below.

TABLE 1

Summary of comparative key FTS reaction characteristics

| Reactor | Parameter | | |
|---|---|---|---|
| | Thermal Gradient | Single-pass Conversion | Thermal Control |
| Packed Bed Reactor | Large | Medium | Poor |
| Slurry Bubble Column Reactor | Small | Low | Good |
| Monolithic Reactor | Small | Medium | Good |
| Microchannel Reactor | Small | High | Good |
| Microtubular Reactors of the present disclosure | Small | High | Good |

Benefits of Microtubular Reactor to Packed Bed Reactors

The increased surface-to-volume ratio in a microtube limits radial heat transport distance and decreases thermal gradients within the reactor. High production rates are indicative of flow reactors; however, the thermal gradients of a Fischer Tropsch process in commercial scale packed bed reactors results in broadened product distributions and poor economics. Microtube reactors as described herein exhibit beneficial high production rates and have limited thermal gradients to improve selectivity to high valued Fischer Tropsch process products.

Benefits of Microtubular Reactor Compared to a Slurry Bubble Column Reactor

The uniform temperature profiles characteristic of continuously stirred reactors like SBCRs produce much tighter product selectivity, but also lower production rates due to reduced reactant concentrations. Because the microtube reactor is a flow reactor, it exhibits the high rates of reaction, such as with PBRs, but also operates with limited thermal gradients. This combination provides for the optimal reactor conditions for exothermic reactions like Fischer Tropsch process reactions to produce high valued products.

Exemplary systems and methods disclosed herein involve the application of in-situ ALD fabrication of a reactor with improved thermal characteristics to obtain the optimal reaction conditions for the exothermic Fischer Tropsch reactions to promote CTL/GTL technologies to higher economic productivity. In stark comparison to other techniques to improve Fischer Tropsch reactor technology, exemplary reactors, systems and methods of the disclosure use simple gas and liquid phase processes to fabricate a reactor having highly controlled material characteristics. The expensive stacking of channels and slurry deposition of catalyst post-construction for conventional microchannel reactors is avoided. Support and catalyst deposition for exemplary reactors described herein is done in-situ with atomic level control.

Benefits of Microtubular Reactor to Monolithic Reactors

Monoliths are extruded metal structures normally of a honeycomb pattern of straight small diameter channels. The small channels promote laminar flow, which improves mass transport properties. Wash-coating of thin catalyst layers are deposited onto the monolith walls. These structures are placed inside a reactor tube where the gap between the monolith and the reactor tube is then the major limiting factor to the system benefits. This gap changes with reactor conditions and the resistance to heat transport out of the system varies. This aspect limits the diameter of the overall system because of increasing resistance for thermal transport.

Microtubular reactors based on in-situ ALD fabrication have the catalytic structure chemically bonded to the tube wall, which means that there is no thermal resistance at the tube wall due to changing gap length. Furthermore, the simplified fabrication of gas and liquid phase processing, all within the final reactor structure, is advantageous over fabricating a metal structure, which must fit tightly within another tube.

Benefits of Microtubular Reactor to Microchannel Reactor

Recent studies of microchannel reactors for Fischer Tropsch reactions have shown large productivities as high as 7.1 g $C_2$+/(g-Co h) at a single pass CO conversion of 90% and $CH_4$ selectivity of 3.4%. However, the scale-up of the microchannel system and incorporation of catalyst into the systems have proven to be impractical or non-cost competitive for most industrial applications. U.S. Pat. Nos. 7,084,180 and 8,188,153 disclose microchannel technology for a Fischer Tropsch process that uses parallel reactor cores that house a catalyst that is either wash-coated within the channel or packed into the reactor channel and permanently bonded around. These microchannel reactors employ catalysts with standard metal oxide support materials and high Co loadings of 25 wt % or greater. U.S. Pat. No. 7,722,833 discloses other microchannel reactors that are fabricated such that process and heat exchange channels are adjacent to each other. Yet other microchannel reactors use steam reforming, which specifies an alumina catalyst support (U.S. Pat. No. 7,722,854); using tungsten for steam methane reforming (U.S. Pat. No. 7,829,602); and using a liquid mixture to prepare the catalyst (U.S. Pat. No. 8,100,996).

The multi-microtubular in-situ ALD-based fabrication technique described herein leaps over these technical complications and cost concerns utilizing a simplified technique. Furthermore, the catalytic productivities for the use of conventional catalysts can be improved upon, with the use of a highly-dispersed ALD based catalyst, as described herein. The reactors of the present disclosure are a departure from other microtube systems, because exemplary reactors as described herein can be heated using a general heat exchanger configuration with multiple reaction tubes and a single heat exchange fluid flowing around them. This is in contrast to other techniques where heat is supplied at the tube surface which would not be advantageous for highly exothermic reactions such as the reactor disclosed in U.S.

Publication No. US2012/0315199, entitled System and Method for Microreactor. This invention is additionally a departure from the previous reference that states use of ALD on an aerogel support whereas this invention's support material is fabricated with ALD of catalyst material.

As noted above, various exemplary reactors in accordance with this disclosure provide highly active Co Fischer Tropsch process catalysts using ALD to deposit metallic Co on support material (e.g., tungsten and/or alumina) within microtubes. Advantages of the combination of concepts are summarized in Table 2.

TABLE 2

Summary of benefits of in-situ ALD-
based Co/W FTS microtube reactors

| Concept | Benefit |
|---|---|
| Support | Increased thermal conductivity, radial heat removal from the exothermic FTS reaction |
| Metallic Co ALD | Increased stability of Co particles against oxidation and sintering for longer lifetime |
| Multi-microtube reactor | Increased surface-to-volume ratio, improved heat removal from exothermic FTS reaction |
| In-situ ALD fabrication | Simplified fabrication by liquid and gas phase processing all within the final reactor housing with highly controlled support and catalyst material properties and Co catalyst of higher activity than conventional incipient wetness deposition techniques |

A multi-microtubular reactor (i.e., fixed tube sheet) can be scaled to larger production by simply increasing the number of tubes. The present disclosure provides a catalyst of higher activity, compared to similar Co catalysts, because no reduction of Co is required. Also, in cases where the support includes heat-conductive material, the thermally conductive material support chemically attached to the tube wall allows for increased radial heat transport out of the reactor.

An in-situ ALD-based multi-microtubular reactor as described herein provides improved productivity to liquid fuel products from CTL/GTL technologies while improving process economics by limiting byproduct production and increasing process controllability. These are advantages also found for microchannel reactors; however, microchannel reactors have not been an economically feasible option for commercial Fischer Tropsch reactions despite their enhanced performance for exothermic reactions. The reactor fabrication process described herein is a feasible economically viable alternative to microchannel reactors for improved Fischer Tropsch process productivity for liquid fuels.

TABLE 3

Characteristics of new technologies competing
with proposed concept reactor

| | Microchannel | Monolith | PBR w/Co ALD Catalyst | ALD-based microtube |
|---|---|---|---|---|
| Fabrication Complexity | High | High | Low | Low |
| Radial Heat Transport | High | High | Low | High |
| Catalyst | Washcoat-Incipient wetness | Washcoat-Incipient wetness | ALD | ALD |

Turning now to FIG. 10, a reactor 1000, including a microtube 1002, having an inner wall 1004, material (e.g., heat-conductive material (e.g., tungsten) and/or oxide (e.g., alumina)) 1006 deposited onto inner wall 1004, and a catalyst 1008 deposited onto the material, is illustrated. In the illustrated example, material 1006 forms a layer on inner wall 1004. Material 1006 may be deposited as a continuous or semi-continuous layer (e.g., form islands). Similarly, although the catalyst 1008 is illustrated as formed in islands, catalyst 1008 may be formed as a continuous layer—e.g., on a continuous layer of the material.

An exemplary shell and microtubular reactor can be fabricated by Micro Tube Fabricators (MTF), Inc., Middlesex, N.J. Materials include stainless steel, nickel alloys, or the like, with outside tube diameters down to 0.025" and a wall thickness down to 0.002," i.e., tubes having an inside diameter of 533 µm—as compared to the existing 400 µm channel microchannel reactors. Hence, sizing is comparable. Laser welding can be used for fabricating a reactor system, as illustrated in FIG. 20.

By way of example, reactor 1000 can be formed by using in-situ ALD deposition of an oxide, in-situ ALD deposition of a heat-conductive (e.g., tungsten) layer (e.g., about 20 to about 200 or about 20 to about 100 ALD cycles of W), and in-situ ALD deposition (e.g., about 1 to about 10, about 1 to about 8, about 2 to about 6, about 2 to about 5, or about 4 cycles of deposition) of a catalyst, such as cobalt. Other catalysts structures, such as those described herein, can also be formed within a microtubular reactor.

Pressure drop in the tube wall coated reactor systems can be calculated from the Hagen-Poiseuille equation and are less than 0.01 bar/m for capillary tubes of 127 µm internal diameters or larger.

Figure 13:
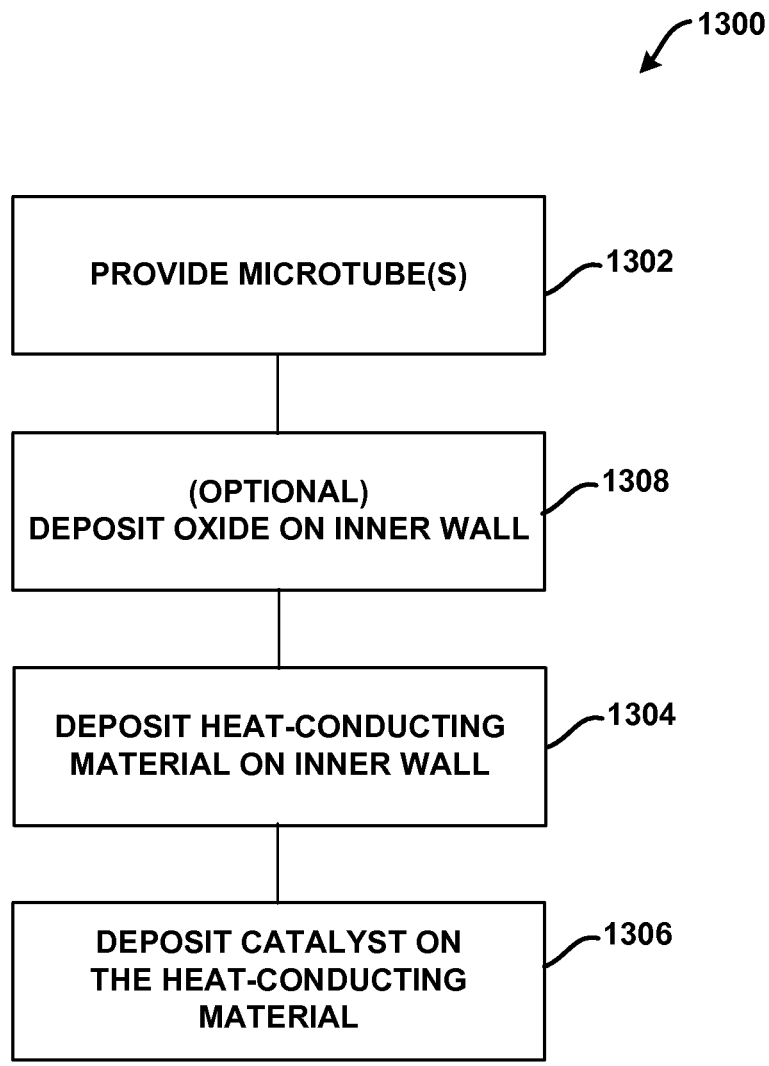
FIGS. 13-18 illustrate methods of forming microtubular reactors in accordance with yet additional exemplary embodiments of the invention.

FIG. 13 illustrates a method 1300 of forming a microtubular reactor, such as reactor 1000. Method 1300 includes the steps of providing one or more microtubes (step 1302), depositing heat-conductive material (e.g., tungsten) on an inner wall of the one or more microtubes (step 1304), depositing catalyst material, such as a metal selected from the group consisting of Co, Ni, FePt, NiPt, Rh, Ru, Pd, Os, V, Fe and Mn, onto the heat-conductive material (step 1306), and optionally depositing an oxide onto the inner wall prior to the step of depositing tungsten (step 1308). The steps of depositing the oxide (optional), depositing heat-conductive material, and depositing catalyst material are performed using in-situ ALD techniques, wherein one or more ALD layers are deposited on the inner wall to form continuous or discontinuous layers (e.g., islands on material) on the inner wall.

Figure 14:
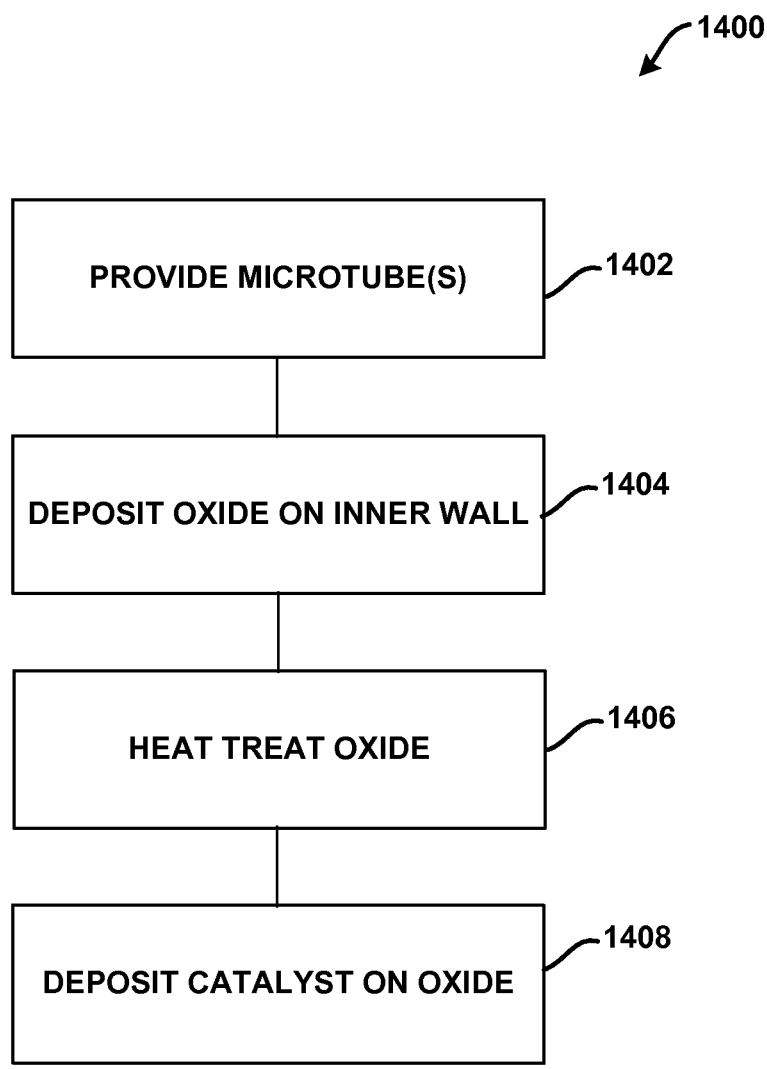

FIG. 14 illustrates another method 1400 of forming a microtubular reactor, such as reactor 1000. Method 1400 includes the steps of providing one or more microtubes (step 1402), depositing oxide (e.g., alumina) on an inner wall of the one or more microtubes (step 1404), heat treating the oxide (step 1406), and depositing catalyst material, such as a metal selected from the group consisting of Co, Ni, FePt, NiPt, Rh$_1$, Ru, Pd, Os, V, Fe and Mn, onto the oxide (step 1408). The steps of depositing the oxide and depositing catalyst material are performed using in-situ ALD techniques, wherein one or more ALD layers are deposited on the inner wall to form continuous or discontinuous layers (e.g., islands on material) on the inner wall.

FIG. 11 illustrates another microtubular reactor 1100 having a porous material and catalyst wall coating 1106 on an inner wall 1104 of microtube 1102. Microtube 1102 and wall 1104 may be the same as microtube 1002 and wall 1004 described above. The porous material and the catalyst wall coating can include the heat-conducting material and/or oxide and a catalyst as described herein and can be chemically bound to wall 1102 to provide advantages as described herein. Exemplary tubes, which include sacrificial polymer material and that can be welded into another microtube to form reactor 1100, are available from Restek, as Siltek®-treated stainless steel PLOT products. Porous wall coated microtube reactor pressure drop can be calculated from the internal void diameter and thus dependent on the porous coat thickness as well as tube diameter.

Figure 15:
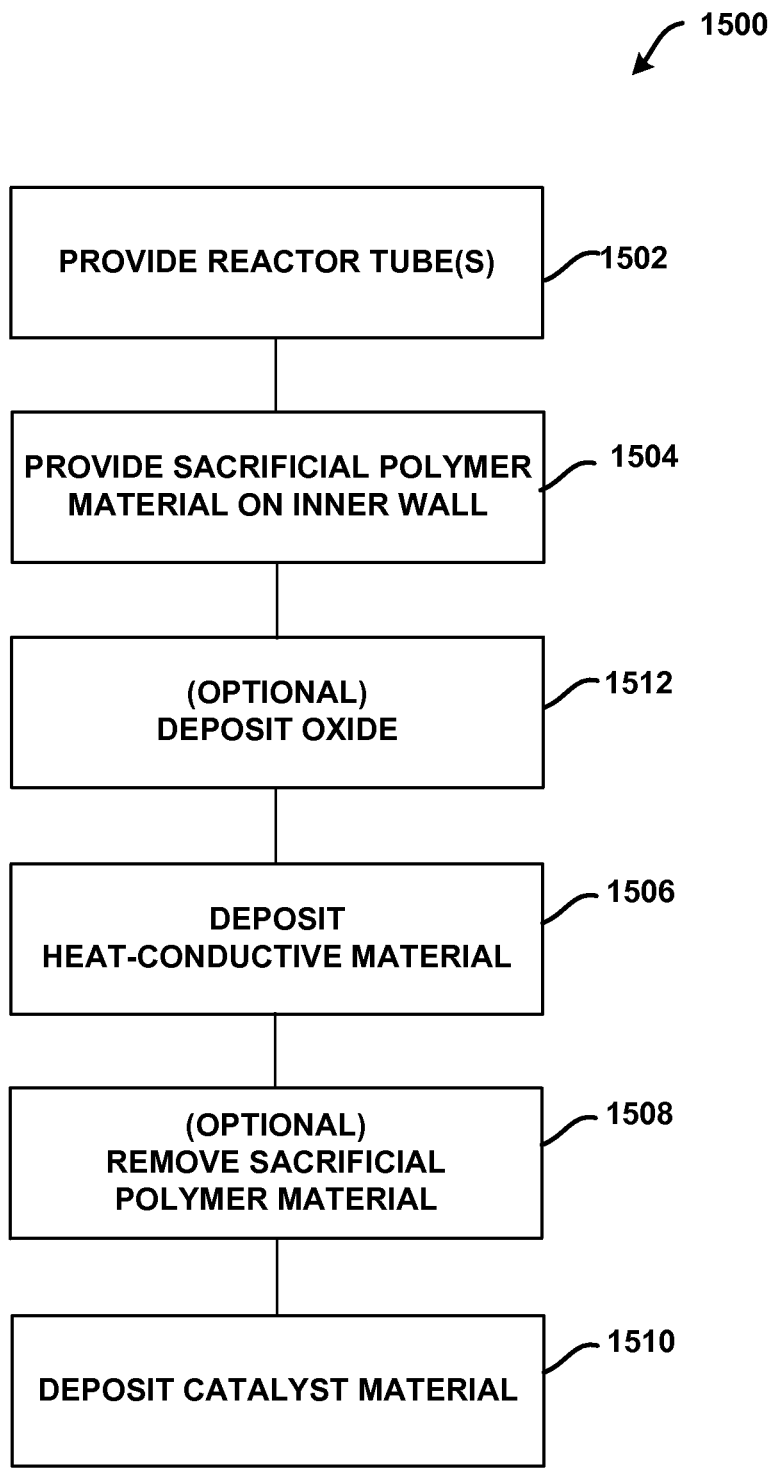

FIG. 15 illustrates a method 1500 of forming a reactor, such as reactor 1100. Method 1500 includes the steps of providing one or more reactor tubes (step 1502), providing sacrificial polymer material or structure on an interior surface of the one or more reactor tubes (step 1504), depositing heat-conductive material onto the sacrificial polymer material (step 1506), optionally removing the sacrificial polymer material or structure to form porous tungsten on the interior surface (step 1508), depositing catalyst material, such as one or more metals selected from the group consisting of Co, Ni, FePt, NiPt, Rh, Ru, Pd, Os, V, Fe and Mn onto the porous heat-conductive material (step 1510), and optionally depositing an oxide on the polymer material (step 1512). The steps of method 1500 may be the same or similar to those described above in connection with methods to form a catalyst, except the reactor is formed using in-situ ALD techniques within a microtube.

Figure 16:
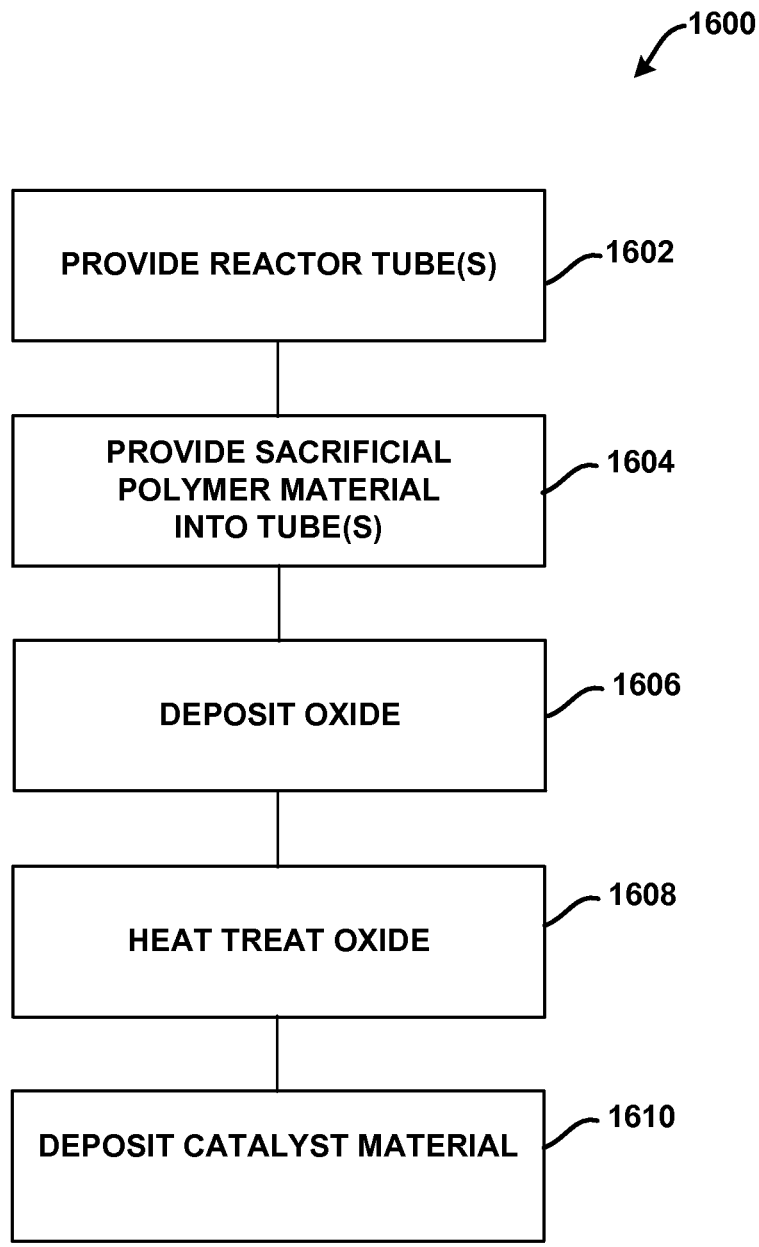

FIG. 16 illustrates another method 1600 of forming a reactor, such as reactor 1100. Method 1600 includes the steps of providing one or more reactor tubes (step 1602), providing sacrificial polymer material or structure on an interior surface of the one or more reactor tubes (step 1604), depositing oxide onto the sacrificial polymer material (step 1806), heat treating the oxide (step 1808) and optionally removing the sacrificial polymer material or structure to form porous oxide on the interior surface, and depositing catalyst material, such as one or more metals selected from the group consisting of Co, Ni, FePt, NiPt, Rh, Ru, Pd, Os, V, Fe and Mn, onto the porous heat-conductive material (step 1610). The steps of method 1600 may be the same or similar to those described above in connection with methods to form a catalyst, except the reactor is formed using in-situ ALD techniques within a microtube.

FIG. 12 illustrates a microtubular reactor 1200, including a microtube 1202 and a packed bed of porous material (e.g., oxide (e.g., alumina) and/or heat-conductive material (e.g., tungsten)) coated with catalyst material 1204. Microtube 1202 and catalyst coated material/structures may be the same or similar to the tubes and catalyst structures described herein. The catalyst structures may be chemically bonded to an interior wall of microtube 1202.

Figure 17:
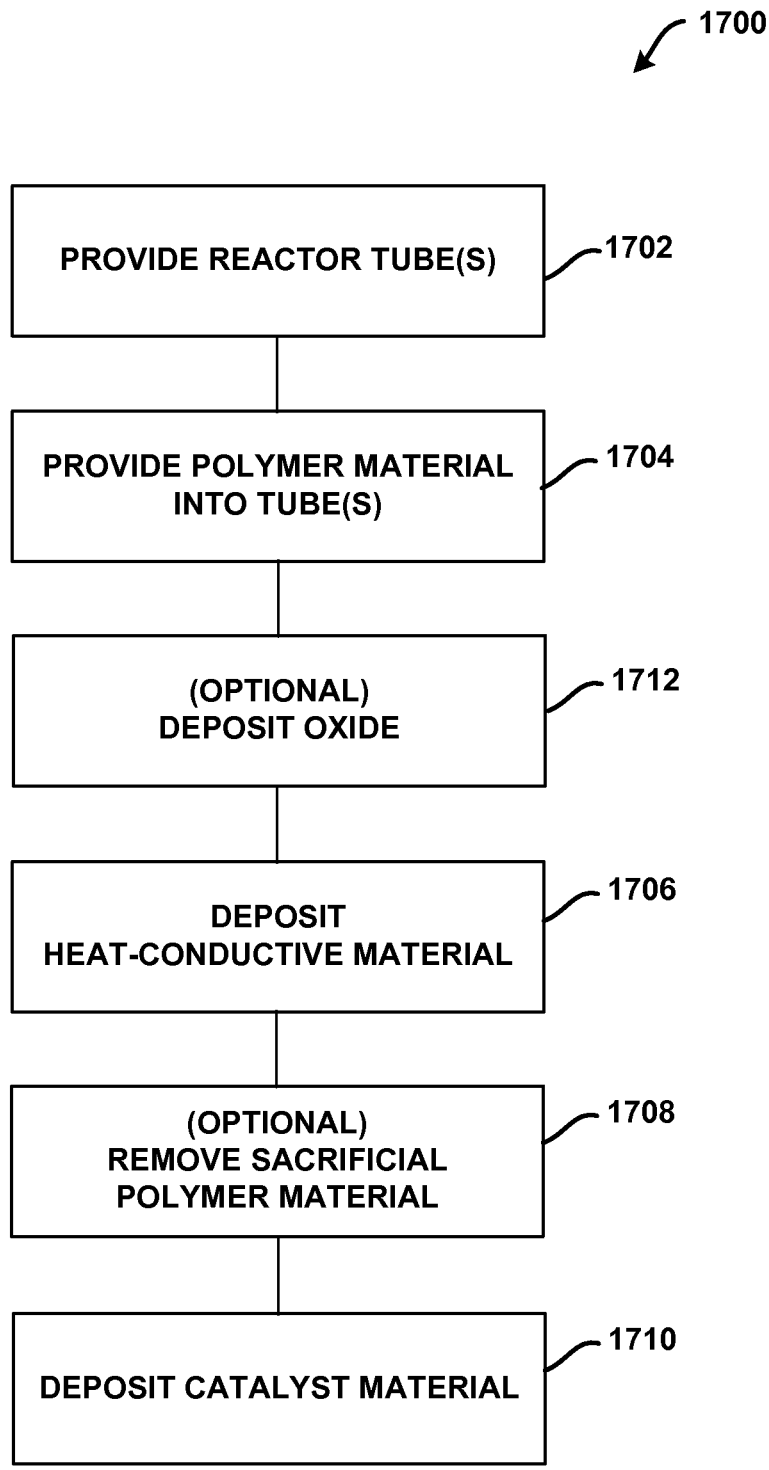

FIG. 17 illustrates a method 1700 of forming a reactor, such as reactor 1200. Method 1700 includes the steps of providing one or more reactor tubes (step 1702), packing sacrificial polymer material onto an interior of the one or more reactor tubes (step 1704), depositing heat-conductive material onto the sacrificial polymer material (step 1706), optionally removing the sacrificial polymer material to form porous heat-conductive material on the interior surface (step 1708), depositing catalyst material, such as one or more metals selected from the group consisting of Co, Ni, FePt, NiPt, Rh, Ru, Pd, Os, V, Fe and Mn, onto the porous tungsten, and optionally depositing an oxide (step 1712). Steps 1702-1712 may be the same or similar to steps 1502-1512, except that step 1702 includes providing a packed bed substrate/template polymer, rather than polymer material attached in an interior wall, as illustrated in FIG. 11. By way of example, the sacrificial polymer material may be obtained from Valco Instruments Co. Inc. under the name HayeSep® porous polymers and may be prepacked into a tube (e.g., a gas chromatography tube having a 1/16" or 1/8" diameter).

Figure 18:
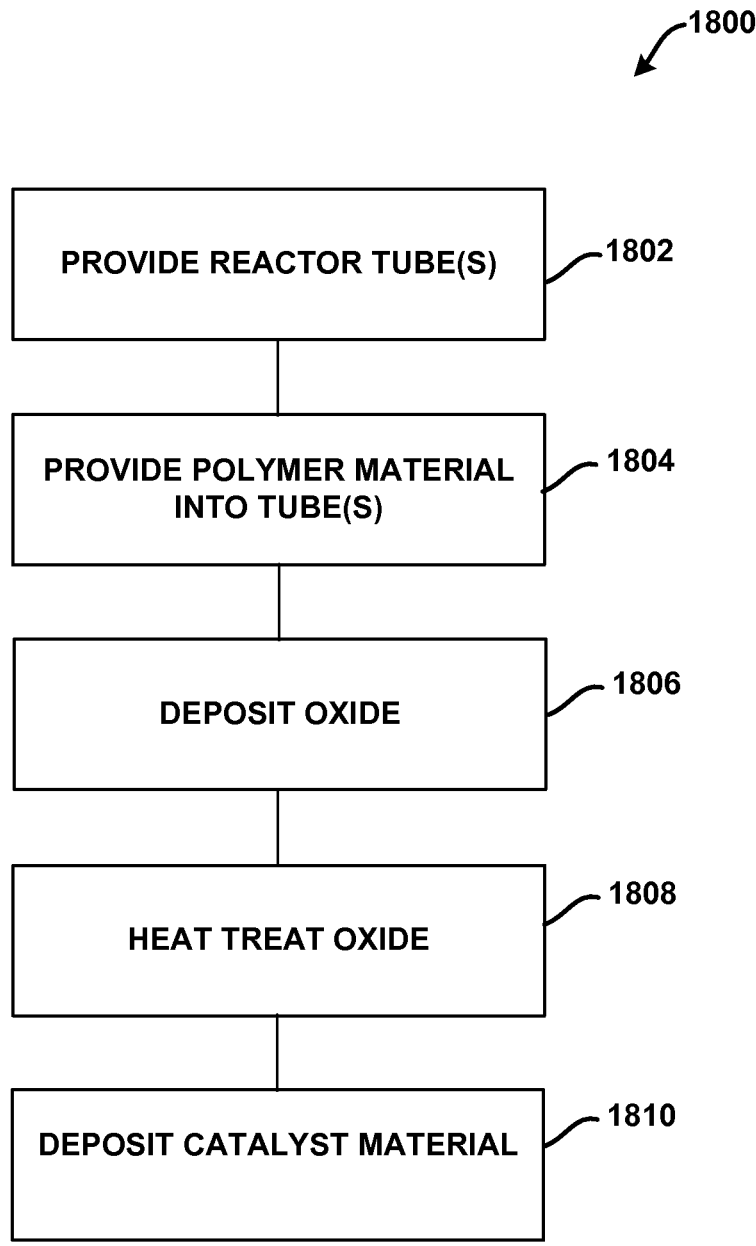

FIG. 18 illustrates another method 1800 of forming a reactor, such as reactor 1200. Method 1800 includes the steps of providing one or more reactor tubes (step 1802), packing sacrificial polymer material onto an interior of the one or more reactor tubes (step 1804), depositing oxide onto the sacrificial polymer material (step 1806), heat treating the oxide (step 1808) and optionally removing the sacrificial polymer material to form porous oxide on the interior surface (step 1808), and depositing catalyst material, such as one or more metals selected from the group consisting of Co, Ni, FePt, NiPt, Rh, Ru, Pd, Os, V, Fe and Mn, onto the porous oxide. Steps 1802-1810 can be the same as similar steps noted above in connection with other methods described herein.

Modeling of a packed bed of porous tungsten particles has shown a plausible increase in effective thermal conductivity of over 5× higher than that for a conventional catalyst support. A plot of the theoretical effective thermal conductivity through a randomly packed bed of particles as a function of particle porosity is displayed in FIG. 19(*b*). The generated structure of the randomly packed bed is shown in FIG. 19(*a*).

Of the three reactor tube concepts described above, the aspect ratios range from 1:1 for tube wall deposition up to about 2000:1 or more, dependent on the porous structure pore length and diameter. Operating conditions can be systematically chosen to reduce cycle times and the overall reactor fabrication time. Exposure times can be performed below half a second for our tubes having an aspect ratio of 2000:1.

FIG. 20 illustrates a system 2000, including a plurality of microtubular reactors 2002, such as reactors 1000, 1100, and/or 1200. Although system 2000 is illustrated with seven microtubular reactors 2002, systems may include any suitable number of microtubular reactors.

As noted above, in addition to cobalt, other catalysts can be deposited onto supports (e.g., alumina and/or tungsten) and can be used in the formation of reactors as described herein. This catalyst synthesis platform is transferrable to other costly metals (Rh, Ru, Pd, Os, V, and the like), as well as more inexpensive catalysts (Ni, Fe, Mn, Co, and the like). Bimetallic/tri-metallic compositions that can be customized for tunable commercial products with essentially no precursor waste can also be formed according to the methods described herein.

The data in FIG. 21 depict the activity for the hydrogenation of propylene, which compares a Ni catalyst produced via incipient wetness (1.0 wt %) to that produced using ALD (0.6 wt %). Not only was the activity an order of magnitude larger, but also the product selectivity between methane and propane was tunable with operating temperature. There is a clear value proposition for adoption of this technology by a manufacturer of Ni catalysts, as the performance gains provided by the ALD approach appear to far outweigh the added cost of the volatile Ni precursor relative to Ni salts used for wet impregnation. Additionally, when Pt ALD was augmented to the Ni ALD, the high activity was evident again but the selectivity for hydrogenolysis was even higher and the catalyst became more resistant to deactivation via coking.

Bis(cyclopentyldienyl)nickel and 20% hydrogen with balance argon can be used to deposit ALD Ni on porous W supports, as described herein. Traditionally, Ni ALD forms conformal NiO films, but the use of $H_2$ can be used to reduce the NiO to Ni. The activity of a 1 cycle Ni ALD catalyst can be an order of magnitude higher than a traditionally prepared (incipient wetness) Ni catalyst for hydrogenation of propylene. The ALD catalyst can also be selective for a hydrogenolysis reaction because of the smaller particle size and size-induced defects, in accordance with theoretical calculations, whereas the traditional catalyst could not catalyze the reaction at all.

As noted above, in accordance with exemplary embodiments of the disclosure, a catalyst includes cobalt deposited onto an alumina substrate. FIG. 22 illustrates thermal conductivity of various structures versus temperature for indicated numbers of cycles of heat-conductive material (tungsten) deposition. As illustrated, a desired amount (e.g., about 15 cycles) of heat-conductive material can be deposited to see increased thermal conductivity. FIG. 33 illustrates thermogravimetric analysis (mass loss) of a catalyst with the protective organic surface layer which was 1 year old. The sample was heated in air from room temperature to 270° C. at a rate of 0.5° C./min. The initial mass loss below 50° C. is due to adsorbed water, the gradual mass loss up to 200° C. does not change the catalysts ability and the more rapid mass loss above 200° C. is oxidation of the protective organic.

Figure 23:
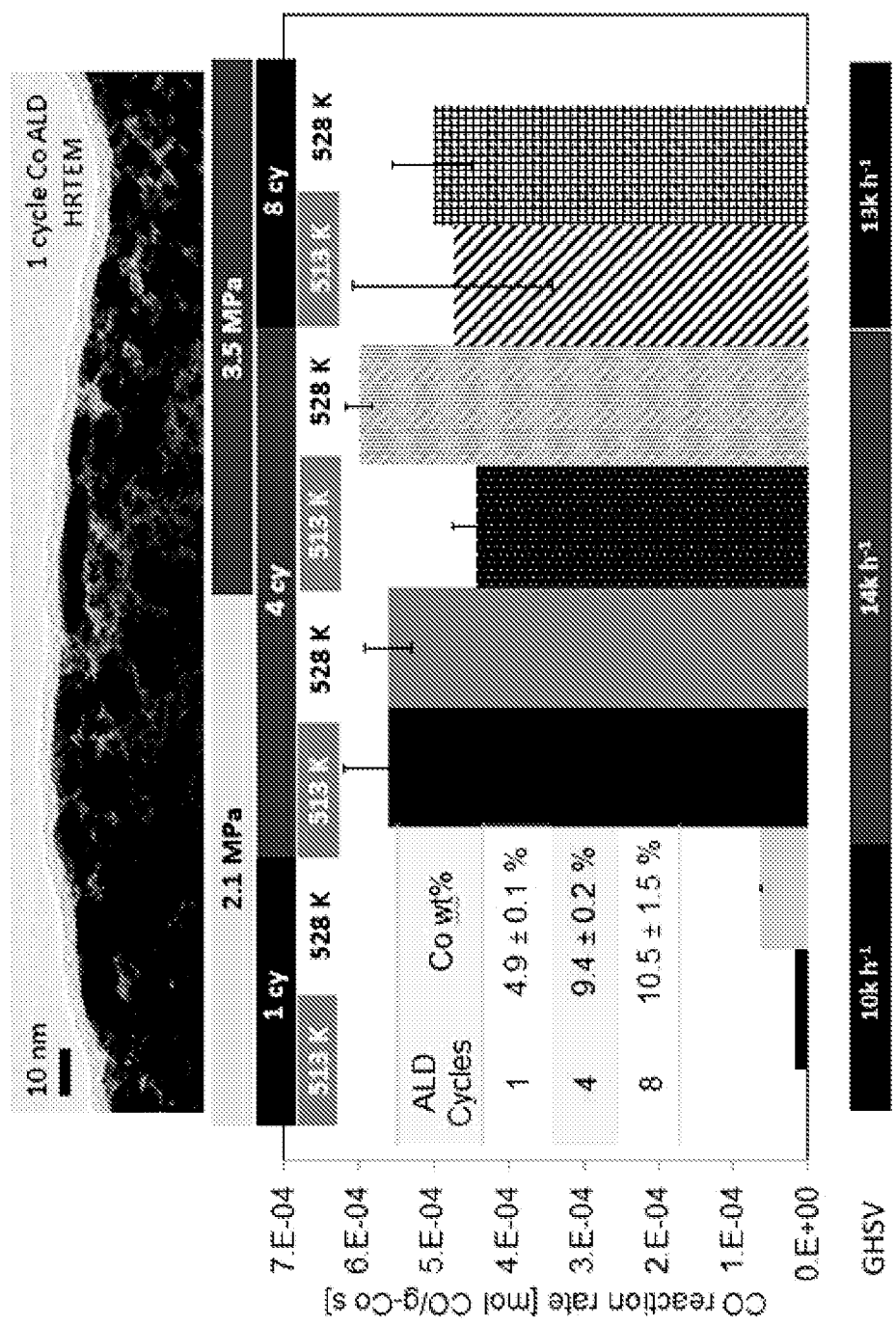

FIG. 23 illustrates cobalt reaction rates versus GHSV (the quotient of the entering volumetric flow rate of the reactants divided by the reactor volume) for 1, 4, and 8 cycles of cobalt deposition. As illustrated, the activity of the cobalt can be increased by ~20× by increasing from about 1 cycle to about 4 cycles.

Figure 24:
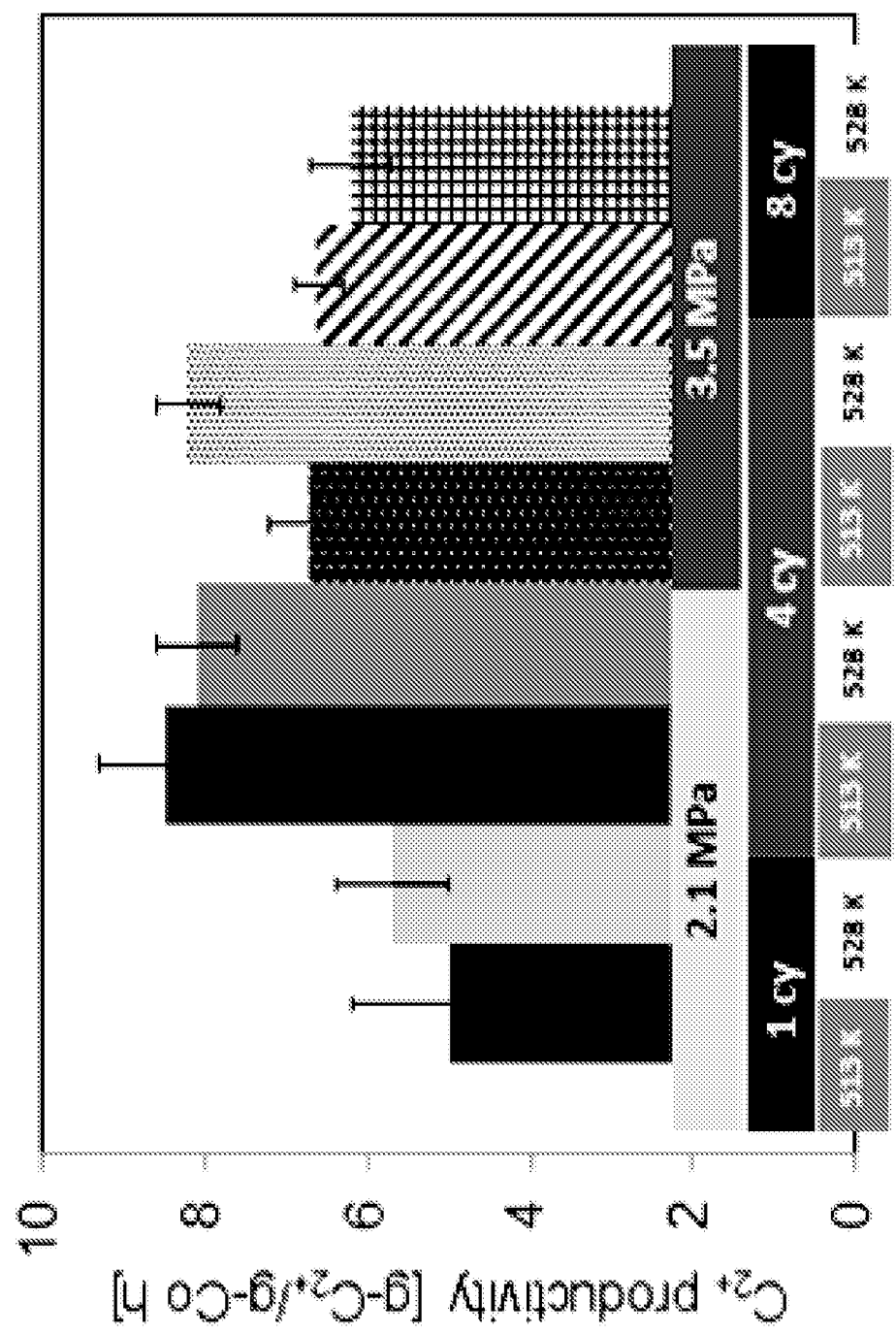
Figure 25:
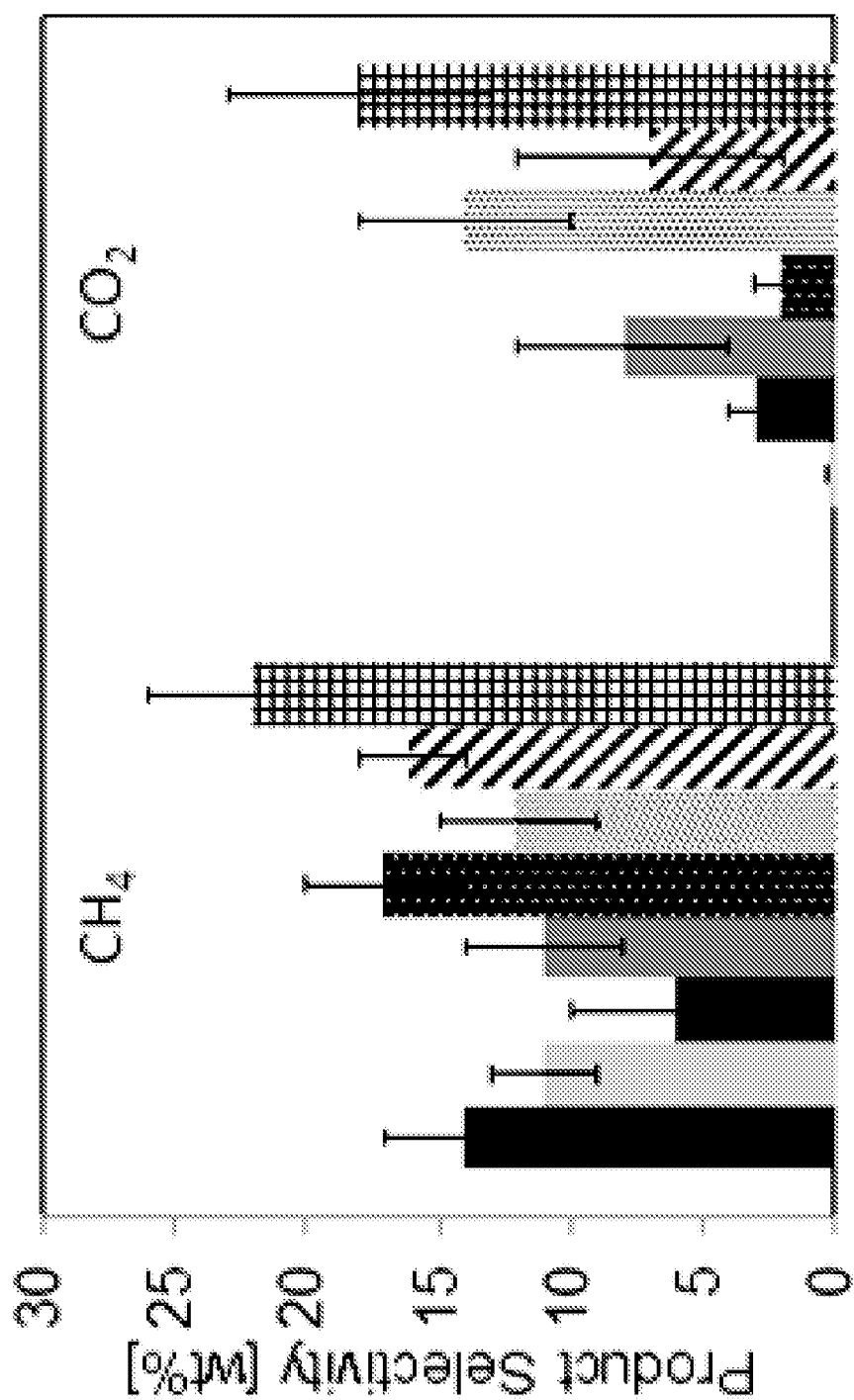

FIG. 24 illustrates $C_{2+}$ productivity as a function of temperature and number of cobalt deposition cycles and FIG. 25 illustrates product selectivity based on a number of deposition cycles and temperature. As illustrated, selectivity of $CH_4$ and $CO_2$ increased at 8 cycles.

Figure 26:
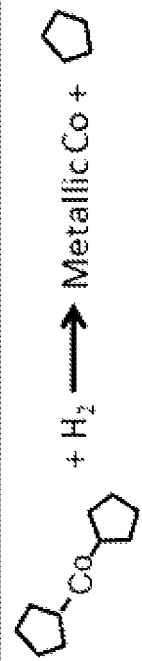
Figure 27:
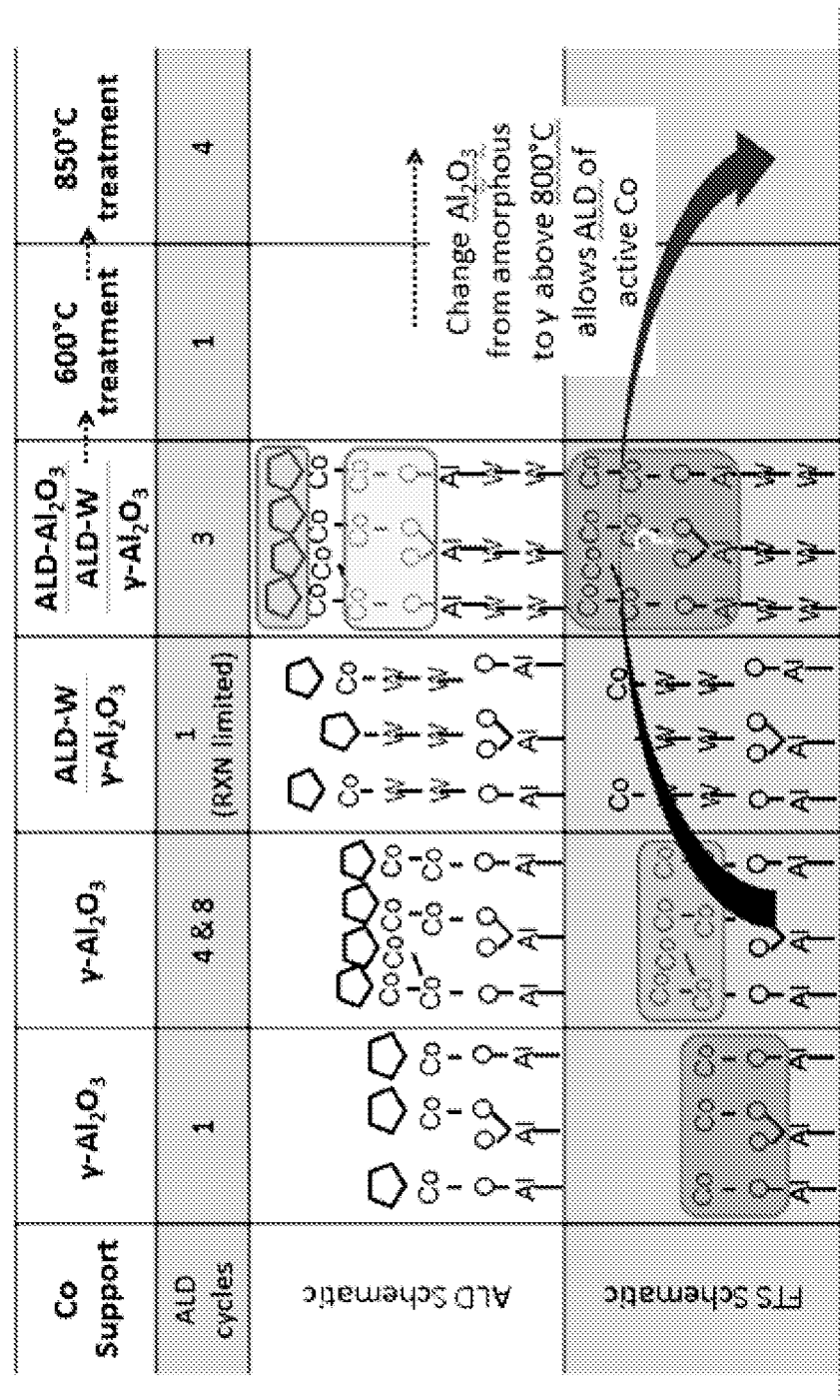
Figure 28:
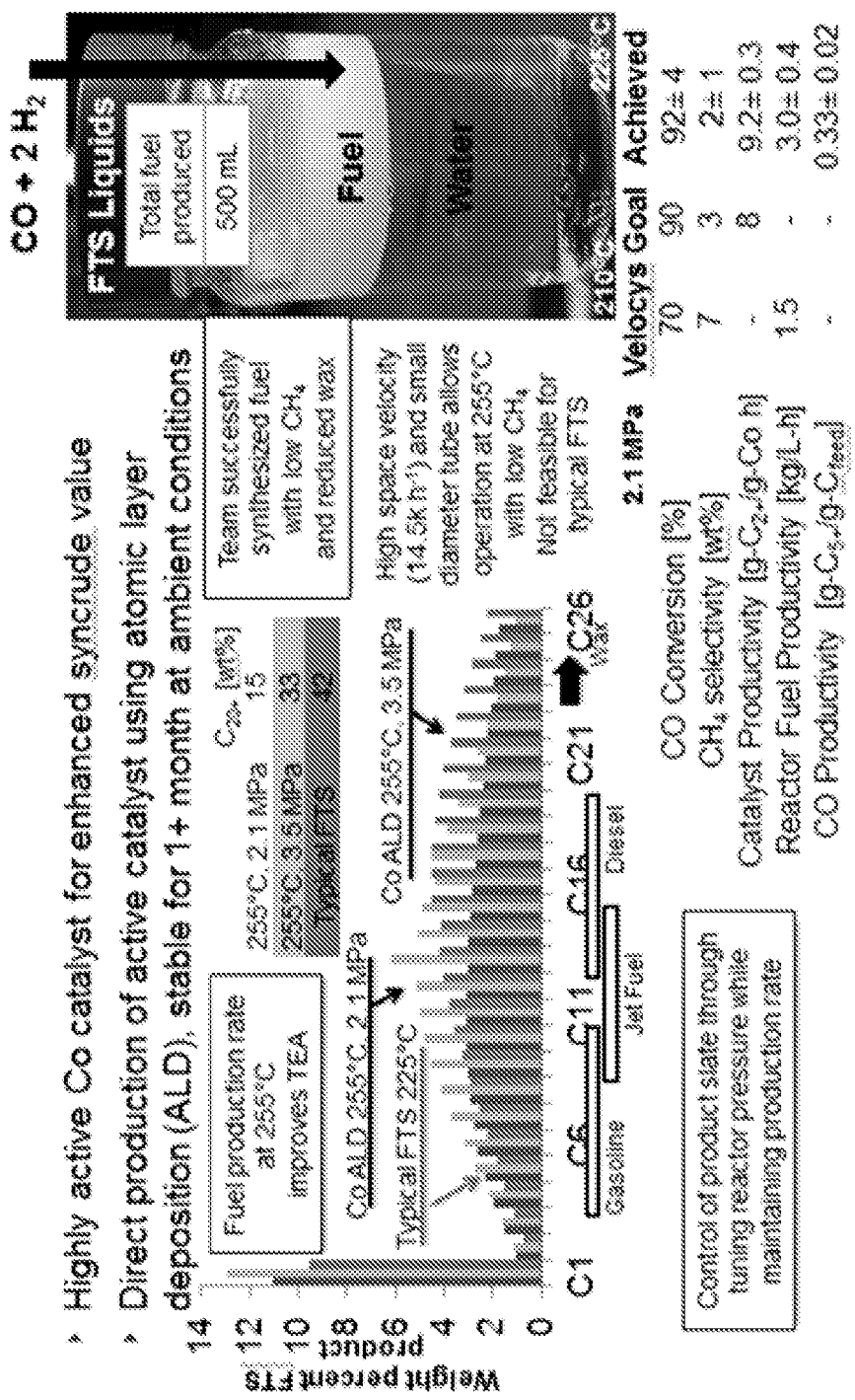

FIG. 26 and FIG. 27 illustrate heat treatment of the ALD deposited alumina catalyst increases the effectiveness of the subsequently deposited catalyst. Without the heat treatment, the ALD deposited alumina is not a suitable substrate for Fischer Tropsch process. FIG. 28 illustrates various results obtained using a cobalt-coated alumina support catalyst as described herein.

Turning now to FIGS. 29 and 30, systems 2900 and 3000 including microtubular reactors, such as reactors 1000, 1100, and/or 1200, are illustrated. With reference to FIG. 29, system 2900 includes a microtubular reactor 2902, a product mixer 2904, a heat exchanger 2906, a two-phase separator 2908, a valve 2910, a three-phase separator 2912, a pump 2914, and a steam cooler 2916. As illustrated, system 2900 can be used to form light syncrude products (e.g., up to about 30 barrels per day) from syngas using a microtubular reactor as described herein. In the illustrated example, heat exchanger 2906 represents the cooling in the flash drum, where the light hydrocarbons are separated out. The products that are dropped out continue on to the final separation column, where the light crude product is collected. Pump 2914 and steam cooler 2916 represent the cooling system that could be used on site for the small scale system. The flare gas stream shown is not recycling back to the reactor because of the high single pass conversion of 96%. Eliminating a recycle stream preserves the desired small equipment size; cost associated with increasing the equipment size outweighs the profit gained from the slightly higher conversions. Additionally, the flare gas flow is significantly smaller after MTR processing of the feed natural gas stream, which would have been flared.

System 3000 includes a microtubular reactor 3002, a product mixer 3004, a heat exchanger 3006, a two-phase separator 3008, a valve 3010, a compressor 3012, and a three-phase separator 3014 to produce light syncrude products (e.g., up to about 20,000 barrels per day) from syngas. In the large scale system 3000, an auxiliary cooling unit is not necessary as utilities are available. A second difference between system 3000 and system 2900 is the addition of the compressed light hydrocarbon product shown. This stream is sent to another process to be refined into additional product. Again, the flare gas stream is flared not recycled due to the negligible gains compared to increased cost.

FIG. 31 illustrates another exemplary system 3100, which include natural gas input 3102, heater 3104, steam methane reformer 3106, compressor 3108, cooler 3110, microtubular reactor system 3112, an air cooler 3114, and phase separator 3116. Tables 4 and 5 and FIG. 32 illustrate experimental results obtained using cobalt catalyst material on alumina porous substrates as described herein.

TABLE 4

| | | | Experimental Results | | | |
|---|---|---|---|---|---|---|
| | Velocys (210° C.) | Goal | 225° C. 2.1 Mpa 6.3k h−1 | 225° C. 3.5 Mpa 6.3k h$^{-1}$ | 255° C. 2.1 Mpa 14.3k h$^{-1}$ | 255° C. 3.5 Mpa 9.5k h$^{-1}$ |
| Deactivation [CO %/day] | 0.08 | — | 0.077 | 0.072 | 0.086 | 0.048 |
| $10^3$ [h$^{-1}$] | — | — | 3.6 | 3.5 | 6.2 | 2.4 |
| Test period [h] | 2000 | — | 25 | 18 | 48 | 22 |

TABLE 5

| | | | Experimental Results | | | |
|---|---|---|---|---|---|---|
| | Velocys (210° C.) | Goal | 225° C. 2.1 Mpa 6.3k h−1 | 225° C. 3.5 Mpa 6.3k h$^{-1}$ | 255° C. 2.1 Mpa 14.3k h$^{-1}$ | 255° C. 3.5 Mpa 14.3k h$^{-1}$ |
| CO Conversion [%] | 70 | 90 | 92 ± 4 | 89 ± 3 | 90 ± 5 | 93 ± 2 |
| $CH_4$ selectivity [wt %] | 7 | 3 | 2 ± 1 | 6 ± 2 | 11 ± 3 | 12 ± 3 |
| $CO_2$ selectivity [wt %] | — | — | 2 ± 1 | 2 ± 1 | 8 ± 4 | 14 ± 4 |
| Catalyst Productivity [g-$C_{2+}$/g-Co h] | — | 8 | 3.9 ± 0.3 | 3.7 ± 0.2 | 8.1 ± 0.4 | 8.2 ± 0.3 |

TABLE 5-continued

|  | Velocys (210° C.) | Goal | Experimental Results | | | |
| --- | --- | --- | --- | --- | --- | --- |
|  |  |  | 225° C. 2.1 Mpa 6.3k h−1 | 225° C. 3.5 Mpa 6.3k h$^{-1}$ | 255° C. 2.1 Mpa 14.3k h$^{-1}$ | 255° C. 3.5 Mpa 14.3k h$^{-1}$ |
| Reactor Fuel Productivity [kg/L-h] | 1.5 | — | 1.5 ± 0.5 | 1.1 ± 0.2 | 2.9 ± 0.6 | 3.0 ± 0.4 |
| CO Productivity [g-$C_{5+}$/g-$C_{feed}$] | — | — | 0.33 ± 0.02 | 0.31 ± 0.01 | 0.28 ± 0.02 | 0.29 ± 0.01 |

The present invention has been described above with reference to a number of exemplary embodiments and examples. It should be appreciated that the particular embodiments shown and described herein are illustrative of the preferred embodiments of the invention and its best mode, and are not intended to limit the scope of the invention. It will be recognized that changes and modifications may be made to the embodiments described herein without departing from the scope of the present invention. These and other changes or modifications are intended to be included within the scope of the present invention.

What is claimed is:

1. A method of forming a catalyst, the method comprising the steps of:
   providing a polymer support structure comprising resin, poly(styrene-divinylbenzene) (PS-DVB), or other high internal phase emulsion (HIPE) polymer;
   forming an oxide support structure by deposing an oxide overlying the polymer support structure;
   heat treating the oxide support structure to form one or more crystalline regions; and
   forming a catalyst layer overlying the one or more crystalline regions, wherein the catalyst layer comprises crystalline planes,
   wherein the oxide support structure comprises material selected from the group consisting of one or more of alumina, silica, and titania.

2. The method of claim 1, wherein the oxide support structure has a surface area greater than or equal to 50 m$^2$/g.

3. The method of claim 1, wherein the step of forming the oxide support structure comprises ALD.

4. The method of claim 1, wherein the step of forming the catalyst layer comprises ALD.

5. The method of claim 1, wherein the catalyst layer comprises one or more of Co, Ni, FePt, NiPt, Rh, Ru, Pd, Os, V, Fe and Mn.

6. The method of claim 1, wherein the oxide support structure comprises interconnected mesoporous and/or macroporous structures.

7. The method of claim 1, further comprising a step of forming a heat-conductive layer between the oxide support structure and the catalyst layer.

8. The method of claim 1, wherein during the step of heat treating, the polymer support structure is exposed to an ammonia, a hydrogen, or an oxygen environment.

9. The method of claim 8, wherein during the step of heat treating, the polymer support structure is exposed to the oxygen environment.

10. The method of claim 1, wherein the catalyst layer comprises cobalt.

11. The method of claim 1, wherein the step of forming the oxide support structure is performed in a packed-bed reactor.

12. The method of claim 1, further comprising a step of forming a heat-conductive layer overlying the catalyst layer.

13. The method of claim 1, further comprising a step of preforming a Fischer Tropsch process using the catalyst layer.

14. The method of claim 1, further comprising the steps of providing a microtubular reactor, wherein the polymer support structure is provided within the microtubular reactor.

15. The method of claim 14, wherein the catalyst layer is deposited on an interior wall of the microtubular reactor.

16. A method of forming a catalyst structure, the method comprising the steps of:
   providing a sacrificial support structure comprising resin, poly(styrene-divinylbenzene) (PS-DVB), or other high internal phase emulsion (HIPE) polymer;
   forming an oxide support structure by conformally depositing oxide material onto the sacrificial support structure;
   depositing, using atomic layer deposition, one or more metals selected from the group consisting of Co, Ni, NiPt, Rh, Ru, Pd, Os, V, Fe, and Mn, onto the oxide support; and
   forming a protective organic layer on the one or more metals by terminating the atomic layer deposition with material derived from an atomic layer deposition precursor,
   wherein the oxide support structure comprises material selected from the group consisting of one or more of alumina, silica, and titania.

17. The method of claim 16, further comprising a step of removing the sacrificial support structure.

18. The method of claim 16, wherein the oxide support structure comprises interconnected mesoporous and/or macroporous structures.

* * * * *